(12) United States Patent
McAllister et al.

(10) Patent No.: US 11,897,298 B2
(45) Date of Patent: Feb. 13, 2024

(54) WEIGHT DISTRIBUTING TRAILER HITCH

(71) Applicant: Weigh Safe, LLC, Lindon, UT (US)

(72) Inventors: Kevin McAllister, American Fork, UT (US); Morgan McAllister, Lindon, UT (US); Todd Mendenhall, South Jordan, UT (US); Brandon Doman, Pleasant Grove, UT (US)

(73) Assignee: Weigh Safe, LLC, Lindon, UT (US)

( * ) Notice: Subject to any disclaimer, the term of this patent is extended or adjusted under 35 U.S.C. 154(b) by 0 days.

(21) Appl. No.: 17/684,032

(22) Filed: Mar. 1, 2022

(65) Prior Publication Data

US 2022/0176760 A1    Jun. 9, 2022

Related U.S. Application Data

(63) Continuation of application No. 16/177,279, filed on Oct. 31, 2018, now Pat. No. 11,267,301.

(60) Provisional application No. 62/579,764, filed on Oct. 31, 2017.

(51) Int. Cl.
| | |
|---|---|
| *B60D 1/24* | (2006.01) |
| *B60D 1/46* | (2006.01) |
| *B60D 1/06* | (2006.01) |
| *B60D 1/34* | (2006.01) |

(52) U.S. Cl.
CPC ............ *B60D 1/247* (2013.01); *B60D 1/06* (2013.01); *B60D 1/248* (2013.01); *B60D 1/345* (2013.01); *B60D 1/46* (2013.01)

(58) Field of Classification Search
CPC ...................................... B60D 1/247
See application file for complete search history.

(56) References Cited

U.S. PATENT DOCUMENTS

| | | | |
|---|---|---|---|
| 3,347,561 A | 10/1967 | Hedgepeth | |
| 3,679,232 A | 7/1972 | Weber | |
| 3,879,061 A * | 4/1975 | Thompson | B60D 1/345 280/405.1 |
| 3,900,212 A * | 8/1975 | Ewing | B60D 1/345 280/492 |
| 4,033,601 A | 7/1977 | Lindahl | |
| 4,211,427 A | 7/1980 | Young et al. | |
| 4,213,627 A | 7/1980 | Thompson | |
| 5,375,867 A | 12/1994 | Kass et al. | |

(Continued)

*Primary Examiner* — Kevin Hurley
(74) *Attorney, Agent, or Firm* — Thorpe North & Western, LLP; David W. Osborne

(57) ABSTRACT

A weight distributing trailer hitch and associated method are described. The weight distributing trailer hitch can include a hitch portion for interfacing with a hitch receiver associated with a vehicle. The weight distributing trailer hitch can also include a ball portion to facilitate coupling with a tongue of a trailer. In one embodiment, the weight distributing trailer hitch can further include a spring bar vertically pivotal relative to the hitch portion, and an adjustment mechanism actuatable to selectively adjust a tilt angle of the spring bar relative to the hitch portion to vary preload on the spring bar and adjustably distribute weight of the trailer relative to the vehicle. In another embodiment, the weight distributing trailer hitch can further include a spring bar for distributing weight of the trailer relative to the vehicle, and a load measurement device to determine a magnitude of a downward force on the hitch ball.

44 Claims, 15 Drawing Sheets

(56) References Cited

U.S. PATENT DOCUMENTS

| | | | |
|---|---|---|---|
| 5,465,991 A | 11/1995 | Kass et al. | |
| 5,562,298 A * | 10/1996 | Kass | B60D 1/06 |
| | | | 280/406.1 |
| 6,286,851 B1 * | 9/2001 | Sargent | B60D 1/075 |
| | | | 280/455.1 |
| 6,299,191 B1 * | 10/2001 | Sargent | B60D 1/247 |
| | | | 280/455.1 |
| 7,506,885 B2 | 3/2009 | Colibert | |
| 7,857,344 B2 * | 12/2010 | Hensley | B60D 1/30 |
| | | | 280/455.1 |
| 8,328,222 B1 | 12/2012 | Roeber et al. | |
| 8,628,107 B2 | 1/2014 | Harper et al. | |
| 8,641,075 B1 | 2/2014 | Angel | |
| 9,381,782 B2 * | 7/2016 | Schwennsen | B60D 1/247 |
| 10,035,391 B2 | 7/2018 | Mauerman et al. | |
| 10,875,368 B1 | 12/2020 | Angel et al. | |
| 11,247,518 B1 * | 2/2022 | Works | B60D 1/247 |
| 2004/0222614 A1 | 11/2004 | Lindenman et al. | |
| 2014/0265240 A1 | 9/2014 | Mccoy et al. | |
| 2015/0069737 A1 | 3/2015 | McAllister | |
| 2015/0102581 A1 | 4/2015 | Schwennsen | |
| 2019/0232740 A1 | 8/2019 | Anderson et al. | |
| 2020/0324591 A1 | 10/2020 | McCall et al. | |
| 2020/0384817 A1 | 12/2020 | Anderson et al. | |
| 2022/0111691 A1 * | 4/2022 | Few | B60D 1/1675 |

* cited by examiner

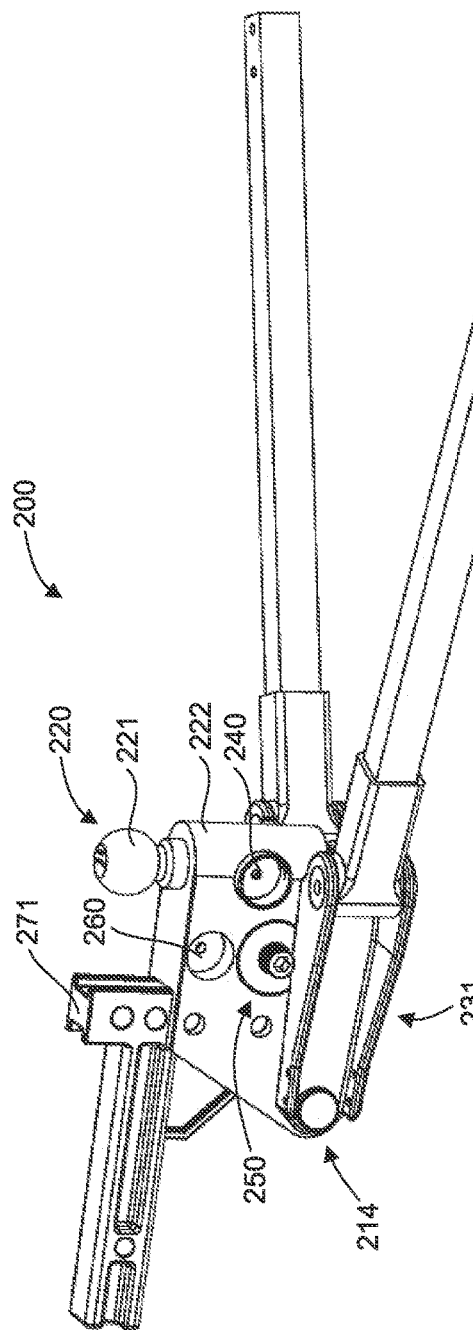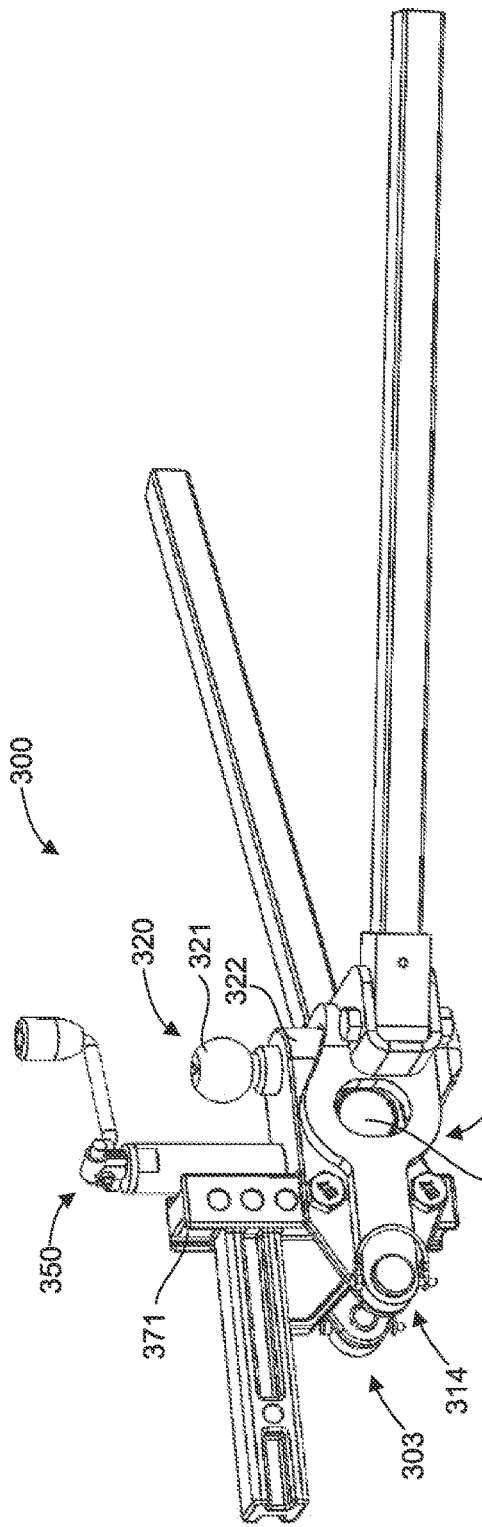

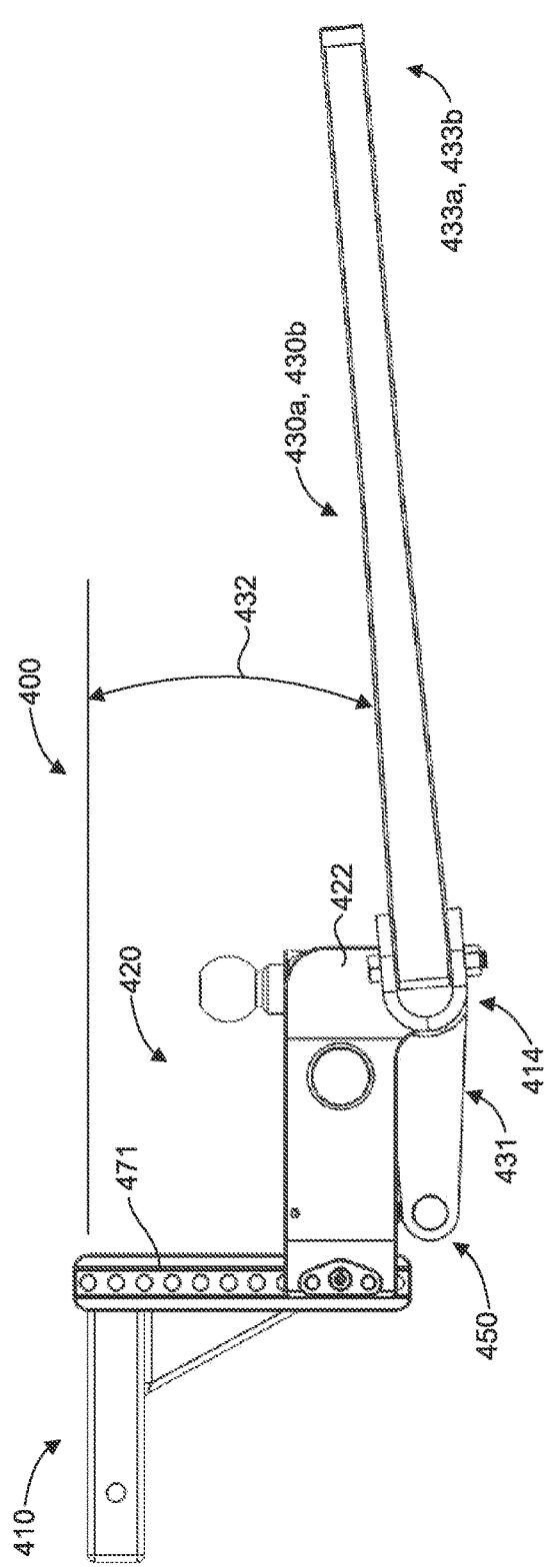
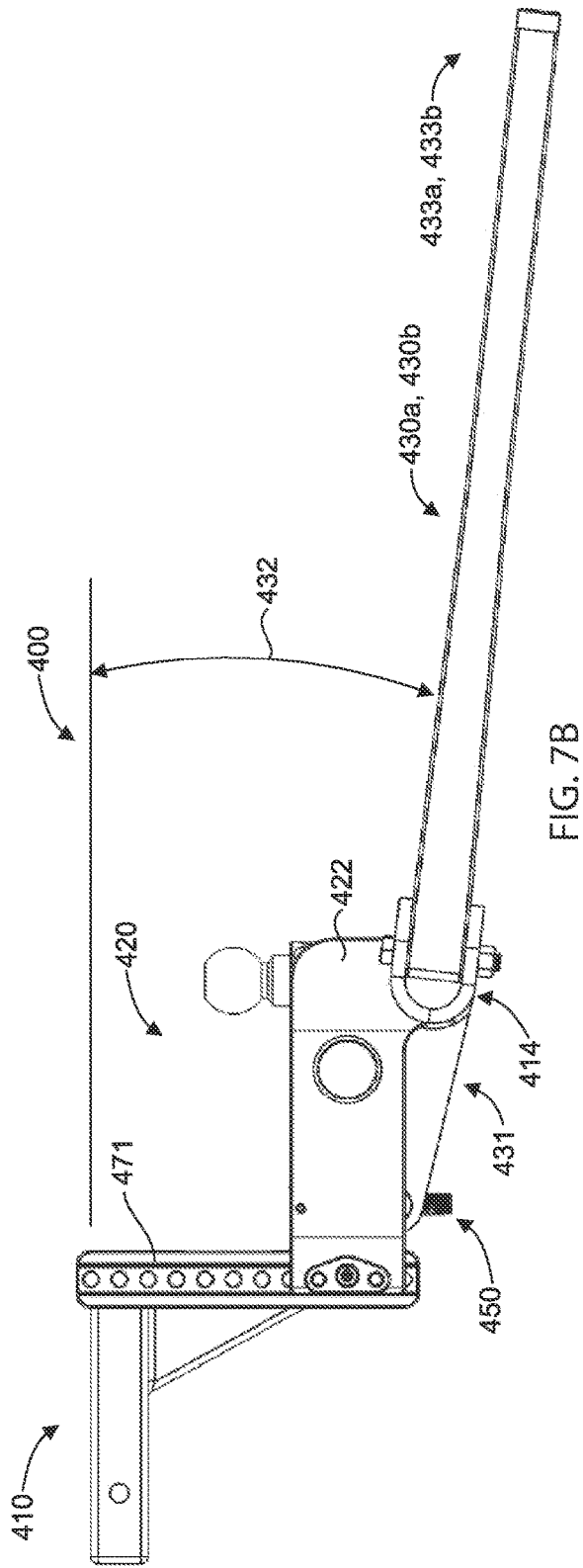

WEIGHT DISTRIBUTING TRAILER HITCH

PRIORITY DATA

This application is a continuation of U.S. patent application Ser. No. 16/177,279, filed Oct. 31, 2018, now issued as U.S. Pat. No. 11,267,301, which claims priority to U.S. Provisional Application Ser. No. 62/579,764 filed on Oct. 31, 2017, each of which are incorporated herein by reference.

FIELD OF THE INVENTION

The present invention relates generally to trailer hitch devices, systems, and associated methods. Accordingly, the present invention involves the mechanical arts field.

BACKGROUND OF THE INVENTION

When towing a trailer behind a vehicle, one factor that can significantly affect safety is the distribution of the trailer's weight among the front and rear wheels of the tow vehicle. When a trailer is hitched to a tow vehicle, the tongue weight typically causes the rear of the tow vehicle to lower, and the front of the tow vehicle to raise. One purpose of a weight distributing hitch is to remove excessive weight from the tow vehicle's rear axle and to distribute it to the front wheels of the tow vehicle and to the trailer wheels. Typical weight distributing hitches require an iterative trial and error set-up process, which often involves repeated loading and unloading of the hitch to achieve the correct weight distribution adjustment.

Another factor that can significantly affect safety is the tongue weight or static downward force that the trailer applies to the hitch of the tow vehicle. If the tongue of the trailer does not apply enough downward force to the hitch, a dangerous condition called trailer sway could result. If the tongue of the trailer applies too much downward force to the hitch, then the rear tires of the tow vehicle can be overloaded, thus pushing the rear of the vehicle around and compromising steering and/or braking of the tow vehicle. A generally acceptable tongue weight for any trailer is somewhere between 9% and 15% of the gross trailer weight (GTW).

SUMMARY OF THE INVENTION

Weight distributing trailer hitch technology is provided. In one embodiment, a weight distributing trailer hitch can include a hitch portion for interfacing with a hitch receiver associated with a vehicle. The weight distributing trailer hitch can also include a ball portion to facilitate coupling with a tongue of a trailer. The weight distributing trailer hitch can further include a spring bar vertically pivotal relative to the hitch portion. In addition, the weight distributing trailer hitch can include a tilt adjustment mechanism actuatable to selectively adjust a tilt angle of the spring bar relative to the hitch portion to vary preload on the spring bar and adjustably distribute weight of the trailer relative to the vehicle.

In another embodiment, a weight distributing trailer hitch can include a hitch portion for interfacing with a hitch receiver associated with a vehicle. The weight distributing trailer hitch can also include a ball portion having a hitch ball configured to couple with a tongue of a trailer. The weight distributing trailer hitch can further include a spring bar for distributing weight of the trailer relative to the vehicle. In addition, the weight distributing trailer hitch can include a load measurement device to determine a magnitude of a downward force on the hitch ball.

In yet another embodiment, a method for distributing trailer weight on a tow vehicle can comprise coupling a tongue of a trailer to a hitch ball of a weight distributing trailer hitch mounted on a tow vehicle. The method can also comprise determining a tongue weight of the trailer with a load measurement device of the weight distributing trailer hitch, the load measurement device being operable to determine a magnitude of a downward force on the hitch ball. The method can also comprise coupling a spring bar of the weight distributing trailer hitch to a frame of the trailer. The method can also comprise determining a first horizontal distance from a center of a rear axle of the tow vehicle to a center of the hitch ball. The method can also comprise determining a second horizontal distance from the center of the hitch ball to an attachment location of the spring bar to the frame of the trailer. The method can further comprise determining a third horizontal distance from the center of the hitch ball to a center of a trailer axle. The method can still further comprise calculating an adjusted downward force to be achieved on the hitch ball operable to evenly distribute trailer weight on front and rear axles of the tow vehicle, wherein the adjusted downward force is calculated based on the tongue weight and the first, second, and third distances. In addition, the method can comprise adjusting preload on the spring bar until the adjusted downward force is achieved on the hitch ball as measured by the load measurement device.

BRIEF DESCRIPTION OF THE DRAWINGS

FIGS. 5A and 5B illustrate perspective views of weight distributing trailer hitches, in accordance with other examples of the present disclosure.

FIG. 7A is a side view of the weight distributing trailer hitch of FIG. 6 with spring bars in a first position.

FIG. 7B is a side view of the weight distributing trailer hitch of FIG. 6 with spring bars in a second position.

DETAILED DESCRIPTION OF THE INVENTION

Definitions

Figure 1:
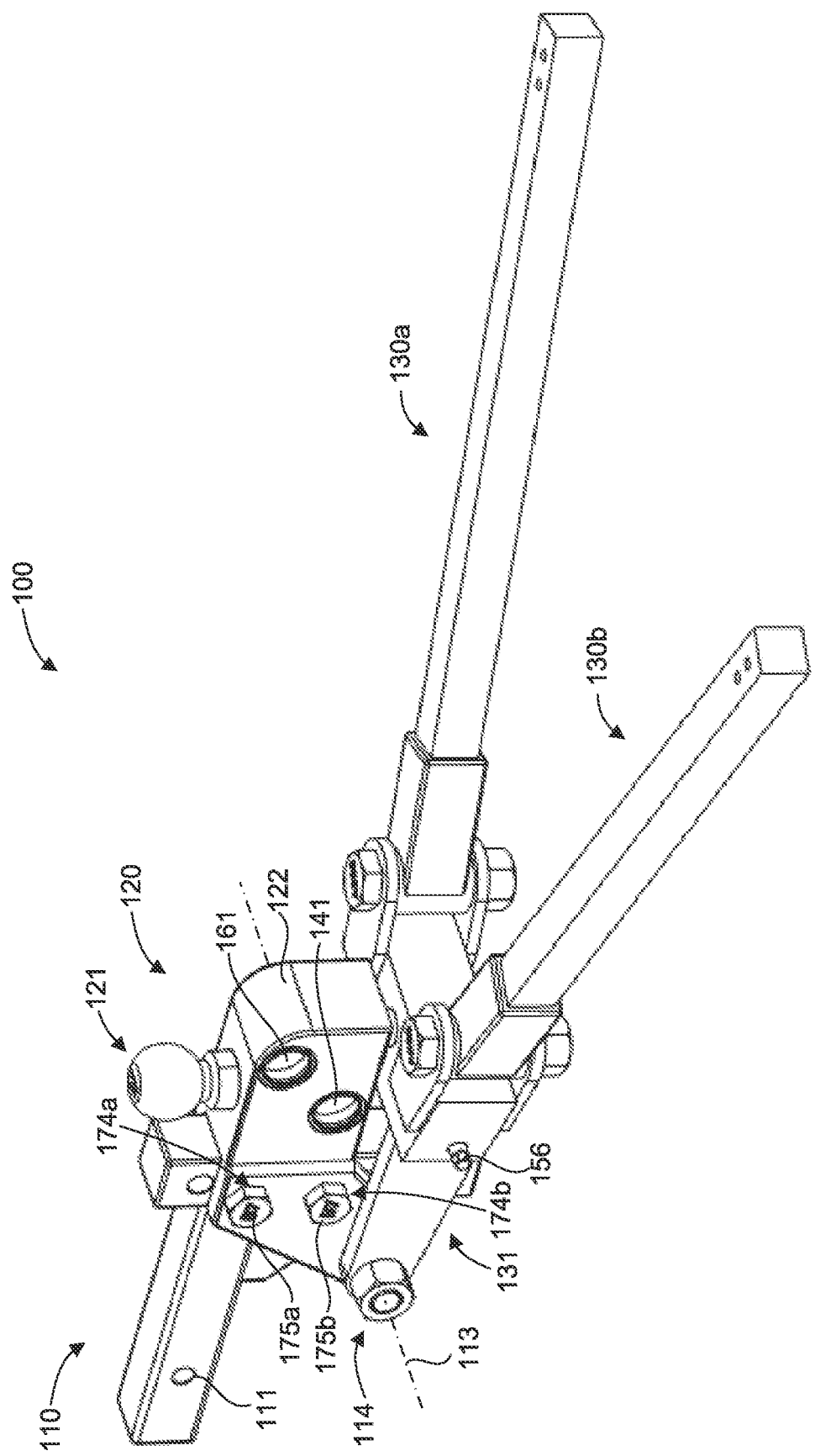
FIG. 1 illustrates a perspective view of a weight distributing trailer hitch, in accordance with an example of the present disclosure.

In describing and claiming the present invention, the following terminology will be used in accordance with the definitions set forth below.

The singular forms "a," "an," and, "the" include express support for plural referents unless the context clearly dictates otherwise.

As used herein, the term "about" is used to provide flexibility to a numerical range endpoint by providing that a given value may be "a little above" or "a little below" the endpoint.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term, like "comprising" or "including," it is understood that direct support should also be afforded to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term "coupled," as used herein, is defined as directly or indirectly connected in a mechanical or nonmechanical manner. Objects or structures described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or subranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

The Invention

Figure 2:
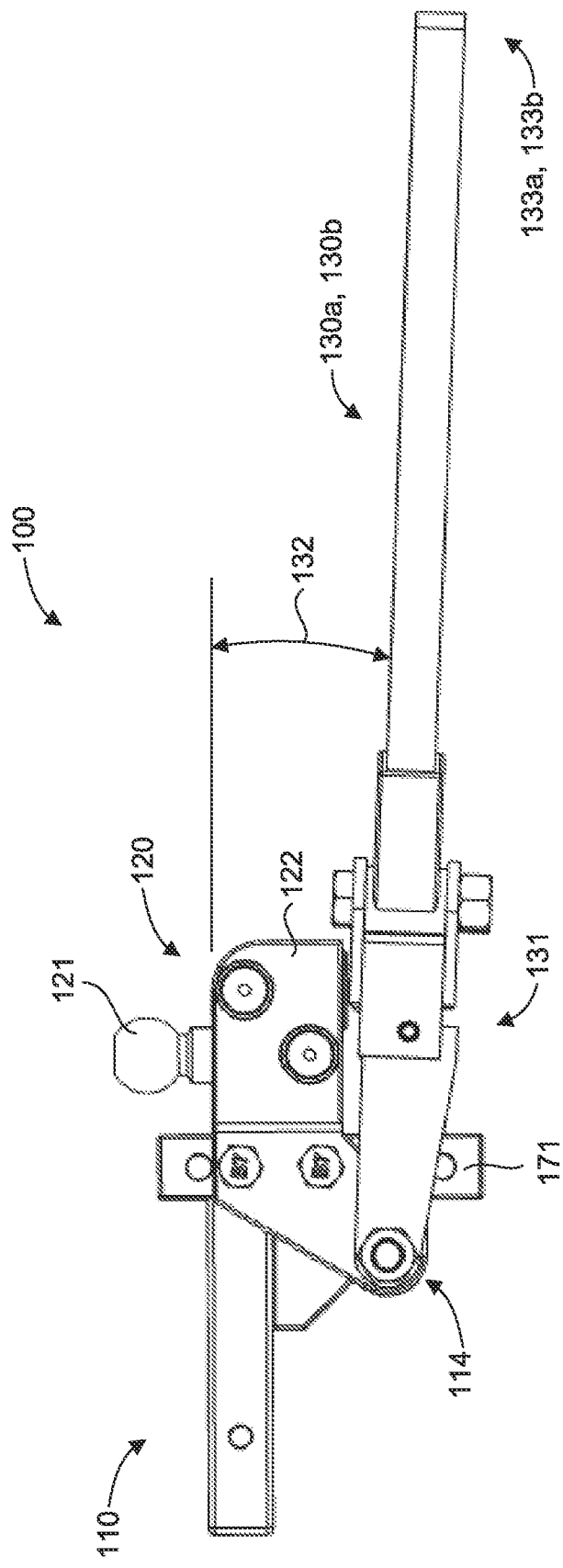
FIG. 2 is a side view of the weight distributing trailer hitch of FIG. 1.
Figure 3:
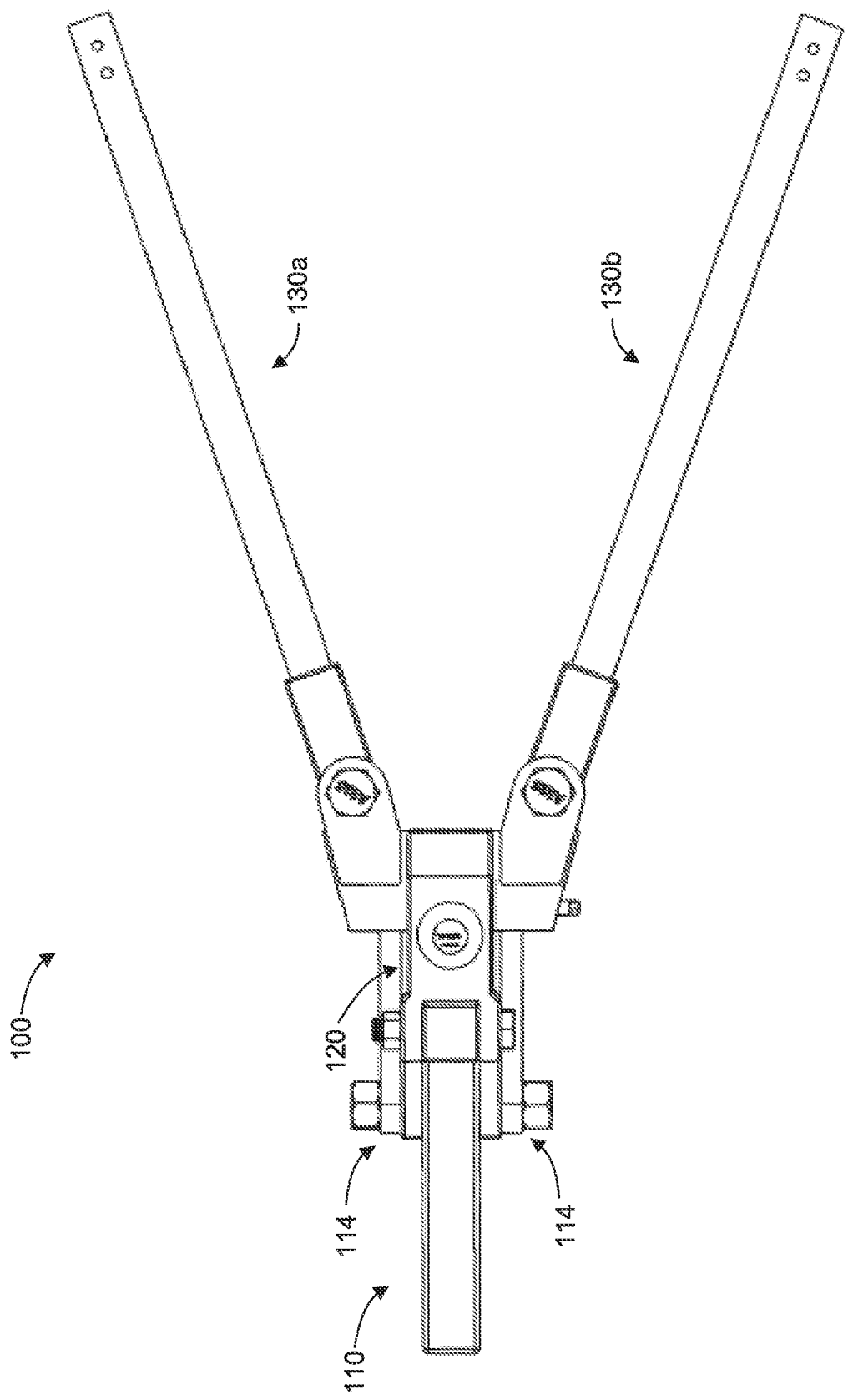
FIG. 3 is a top view of the weight distributing trailer hitch of FIG. 1.

With reference to FIGS. 1-3, illustrated is a weight distributing trailer hitch 100. The weight distributing trailer hitch 100 can include a hitch portion 110 for interfacing with a hitch receiver associated with a vehicle, such as a standard 2½", 2", 3" or 1¼" size square hitch receiver. The hitch portion can include a hole 111 or other suitable feature to facilitate securing the weight distributing trailer hitch 100 to a hitch receiver, such as with a pin or threaded fastener through the hole 111 of the hitch portion 110 and a hole of a hitch receiver.

The weight distributing trailer hitch 100 can also include a ball portion 120 to facilitate coupling with a tongue of a trailer. The ball portion 120 can include a hitch ball 121 configured to couple with a tongue of a trailer. In some embodiments, the ball portion 120 can be configured to couple to the hitch ball 121 in any suitable manner, such as with a threaded coupling, a clearance hole for a threaded fastener, or other removable coupling. In one aspect, the hitch ball 121 can be coupled to the ball portion 120 with a weld or other a permanent coupling. Trailer tongues have a variety of sizes and can require differing hitch ball sizes to securely couple a trailer to a towing vehicle. Thus, the hitch ball can be configured to fit a given trailer tongue. Some standard hitch ball sizes can include 1⅞", 2", 2⁵⁄₁₆", and 3" diameters. Although the weight distributing trailer hitch 100 includes what is generally referred to as a "ball portion" throughout the present disclosure for coupling with a trailer, it should be recognized that the weight distributing trailer hitch 100 can include any suitable form of coupling with a trailer, such as a lunette ring and pintle hook.

The weight distributing trailer hitch 100 can include one or more spring bars 130a, 130b for distributing weight of the trailer relative to the vehicle, such as a substantially even distribution between front and rear wheels of the vehicle. The spring bars 130a, 130b can be configured to couple to arms of the "A" frame portion of a tongue of a trailer. The spring bars 130a, 130b can be coupled to the trailer in any suitable manner known in the art, such as utilizing a chain, a cable, a bracket, etc.

Figure 4:
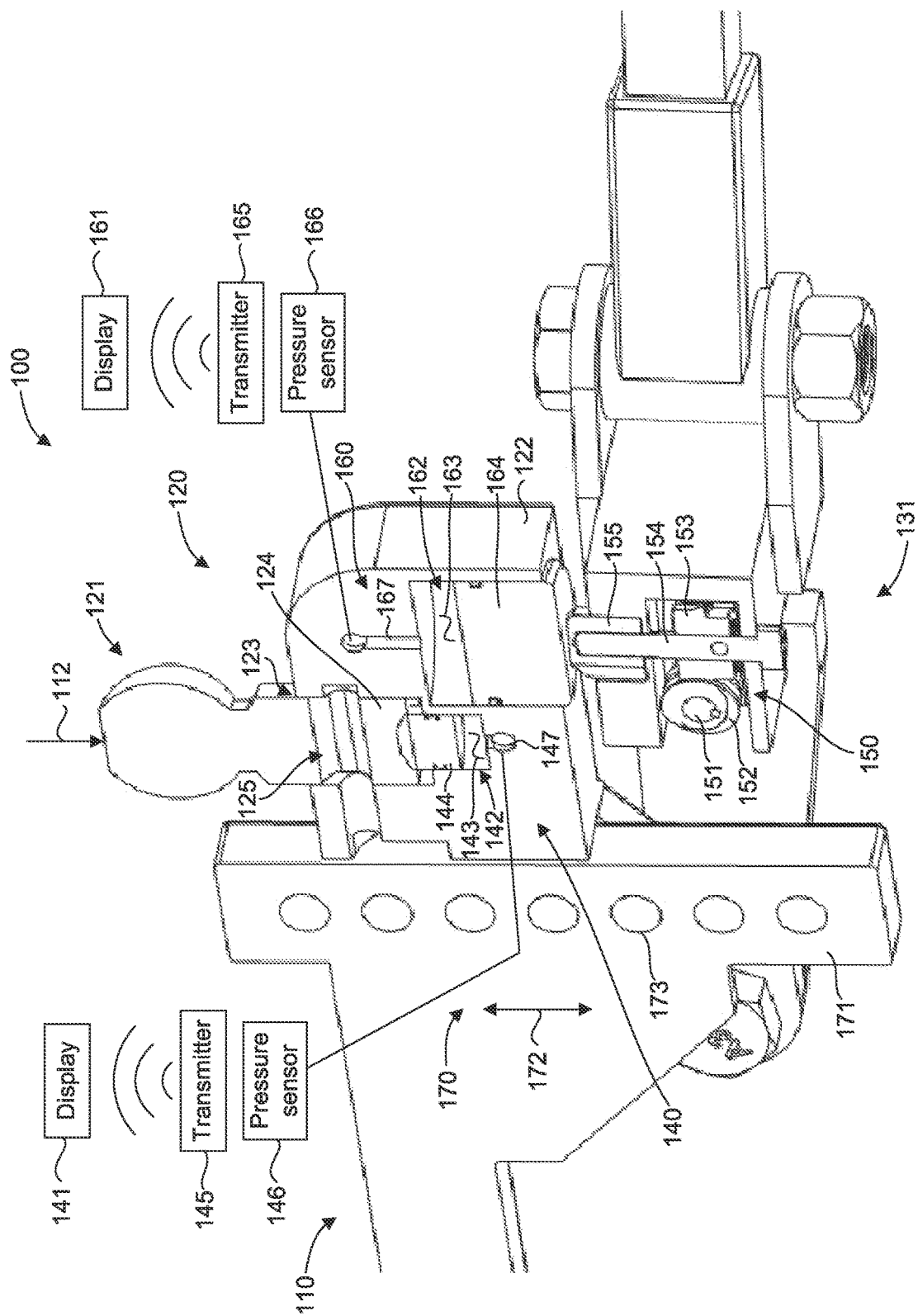
FIG. 4 is a side cross-sectional view of the weight distributing trailer hitch of FIG. 1.
Figure 6:
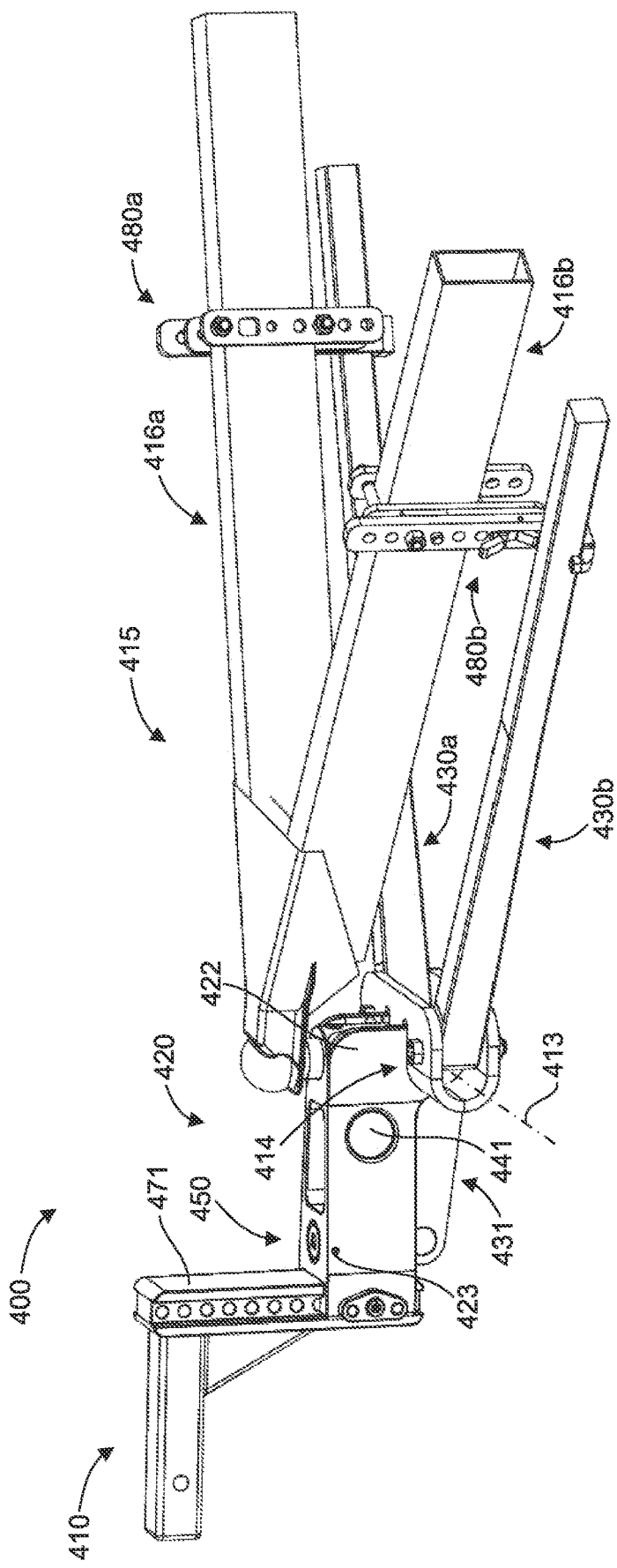
FIG. 6 illustrates a perspective view of a weight distributing trailer hitch, in accordance with an example of the present disclosure.
Figure 8:
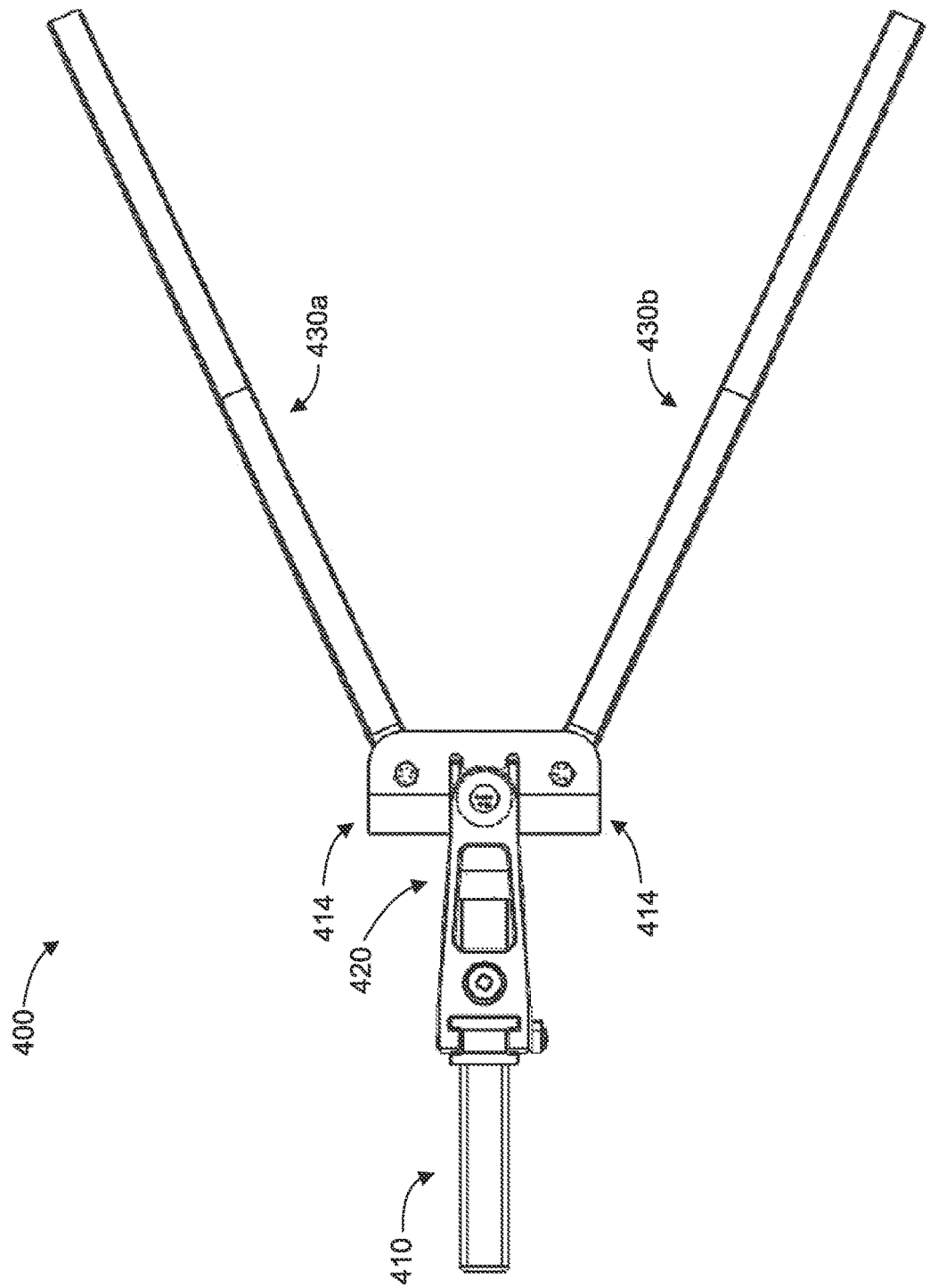
FIG. 8 is a top view of the weight distributing trailer hitch of FIG. 6.
Figure 9:
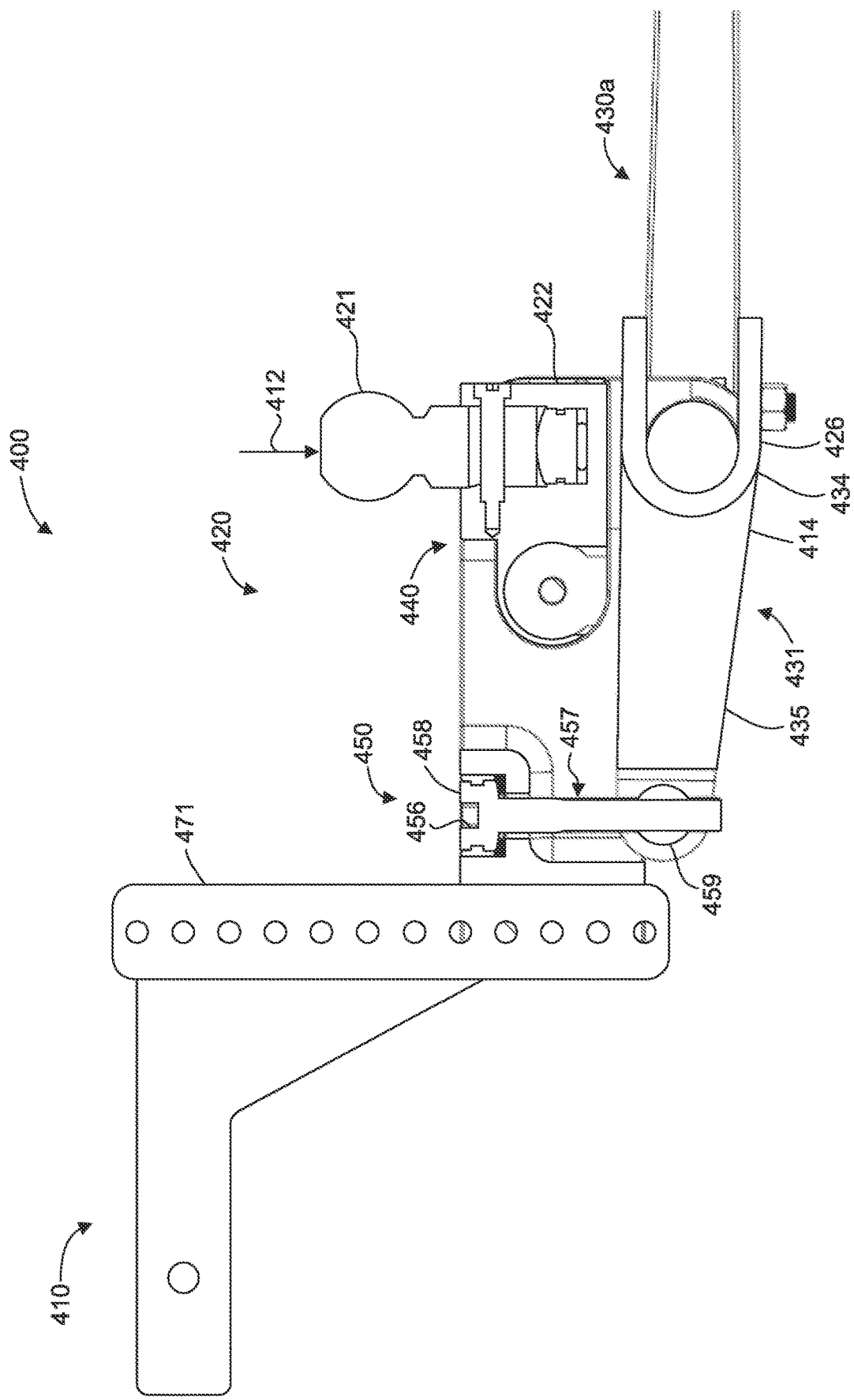
FIG. 9 is a side cross-sectional view of the weight distributing trailer hitch of FIG. 6.

In some embodiments, as illustrated in FIG. 4, the weight distributing trailer hitch 100 can include a load measurement device 140 to determine a magnitude of a downward force 112 on the hitch ball 121 and, therefore, the tongue weight of a trailer. It should be recognized that any suitable load measurement device can be utilized. For example, the load measurement device can comprise any suitable type of load measurement device or mechanism (e.g., a load sensor, a load cell, a pressure sensor, etc.). In some embodiments, the load measurement device 140 can include a piston, a hydraulic medium (e.g., a fluid), and a pressure sensor or a load gauge.

In the illustrated embodiment, the load measurement device 140 includes a reservoir 142 having a fluid 143 and a piston 144 disposed therein. The piston 144 can affect a pressure of the fluid 143 as a result of the downward load 112 on the hitch ball 121. The load measurement device 140 also includes a pressure sensor 146, or gauge, in fluid communication with the reservoir 142, such as via a conduit 147, to indicate a quantity of the downward load 112 based on the pressure of the fluid. The pressure sensor 146 can be calibrated to indicate a load acting on the hitch ball 121. The reservoir 142 can contain a hydraulic fluid and/or a pneumatic fluid. Any suitable fluid can be used, such as non-compressible power transfer fluids, compressible fluids, or a combination thereof. Non-limiting examples can include, mineral oil, synthetic oil, polyols such as ethylene glycol, glycerol, glycol ethers, etc., water, phosphate ester fluids, silicone fluids, air, nitrogen, the like, and combinations thereof.

In some embodiments, the load measurement device 140 can be associated with the ball portion 120. In one aspect, the weight distributing trailer hitch 100 includes a trailer tongue weight measuring portion that includes the hitch ball 121 and the load measurement device 140. The hitch ball 121 and the piston 144 are rigidly and mechanically coupled to one another, such that movement of the hitch ball 121 directly causes movement of the piston 144. Thus, the hitch ball 121 is configured to exert a force on the piston 144, thereby affecting a pressure of the fluid 143 in response to the downward force 112 on the hitch ball 121.

The ball portion 120 can include a ball support structure 122. The ball support structure 122 can serve to couple the ball portion 120 to the hitch portion 110. The ball support structure 122 can define various features of the load measurement device 140 and can interface with and support the hitch ball 121. For example, the ball support structure 122 can define, at least in part, the reservoir 142 and/or the conduit 147. The support structure can also have a hitch ball opening 123 to receive a lower portion 124 of the hitch ball 121 and facilitate the hitch ball exerting a force on the piston 144. The hitch ball opening 123 can be configured to constrain translational movement of the hitch ball 121 to a single degree of freedom (i.e., parallel to the downward force 112), which can facilitate the hitch ball 121 exerting a force on the piston 144.

In some embodiments, a display 141 can be operably coupled to the load measurement device 140 to indicate the magnitude of the downward force on the hitch ball 121 as determined by the load measurement device 140. For example, a display 141 for the pressure sensor or gauge can be included to indicate the magnitude of the load or downward force 112. Such a display can be located proximate the pressure sensor 146 or included with a gauge. The gauge or display can take any suitable form in view of the selected structure, such as an analog display (e.g. a dial), a digital display or read out, etc.

The display 141 can be coupled to the load measurement device 140 in any suitable manner such that the display can properly indicate the magnitude of the load on the hitch ball 121. In one aspect, the display can be mechanically, electrically, hydraulically, and/or pneumatically coupled to the load measurement device 140. The load measurement device 140 and/or the display 141 can therefore include any suitable mechanical, electrical, hydraulic, and/or pneumatic device or mechanism that can facilitate the determination and/or display of the magnitude of the load on the hitch ball 121. For example, the load measurement device 140 and/or the display 141 can include a processor and/or memory to determine the magnitude of the load on the hitch ball 121. In some embodiments, a display can be associated with a load gauge that both measures and displays a load. It should be recognized that a display can be disposed in any suitable location and can be in communication with the pressure sensor via any suitable means. For example, the display 141 can be associated with the ball portion 120. In one aspect, a mobile device, such as a smartphone or a tablet, can include a processor and/or memory used to determine the magnitude of the load on the hitch ball 121, such as by executing an application. In another aspect, the display 141 can be calibrated to indicate the magnitude of the load on the hitch ball 121, based on mechanical, electrical, hydraulic, and/or pneumatic input from the load measurement device 140. In a particular aspect, therefore, the display 141 can be integral with the load measurement device 140 in determining the magnitude of the load on the hitch ball 121.

In some embodiments, a transmitter 145 can be included to wire or wirelessly transmit or communicate load data pertaining to the magnitude of the downward force on the hitch ball 121 to the display 141. In one aspect, the transmitter 145 can transmit load data to a location remote from the weight distributing trailer hitch 100, such as to a remote display or a remote device, such as a mobile device (e.g., a smartphone, tablet, laptop, etc.), to facilitate proper distribution of loads as discussed below. A remote display, for example, can be located inside the vehicle and can receive load data for display to the driver or operator of the vehicle. The transmission of load data can be via vehicle wiring, such as the taillight wiring, which can be utilized to communicate load data via a signal to the interior of the vehicle. In another aspect, a wireless transmission of load data can be accomplished via a Bluetooth connection, a cellular network, LAN, WIFI, an RF signal, an infrared signal, or any other suitable type of wireless network, connection, and/or protocol. In one aspect, a remote display can comprise a screen of a mobile device, such as a smartphone or a tablet. Thus, the load data can be communicated to any suitable location, in or out of the vehicle. It should therefore be recognized that a local or remote display or mobile device can be disposed in any suitable location and can be in communication with the load measurement device 140 via any suitable means. In one aspect, the display can be local, in another aspect, the display can be remote. In an additional embodiment, both local and remote displays can be use. In one aspect, the load measurement device 140, the display 141, and/or the transmitter 145, or any other related item or device, such as a processor, memory, a battery, or a RF receiver, can be located in or on the weight distributing trailer hitch 100. In addition, when electronic components are included, a suitable power source, such as a battery compartment or connecter that allows connection with a powered wiring harness can be used and included with a suitable component.

In one aspect, the hitch ball 121 can be captured and prevented from unwanted separation from the ball support structure 122. For example, the hitch ball 121 can have a retention opening 125 in the lower portion 124 that receives a retention pin (not shown) to facilitate capturing the hitch ball 121 in the hitch ball opening 123. The retention opening 125 and the retention pin can be configured to facilitate movement of the hitch ball 121 against the piston 144 in response to the downward force 112 on the hitch ball. The shapes and/or sizes of the retention pin and the retention opening 125 can be of any suitable configuration (e.g., cross-sectional shapes that are circular, oval, elliptical, rectangular, etc.) or dimension. In addition, the retention opening 125 and the retention pin can be in any suitable location. In one aspect, the retention pin can be accessible to facilitate removal of the retention pin and, thus, the hitch ball 121. The hitch ball 121 can therefore be interchanged with another hitch ball having a different diameter ball to properly fit a trailer tongue or to replace a damaged hitch ball.

In some embodiments, the weight distributing trailer hitch 100 can include features and structure that facilitate a vertical height adjustment of the ball portion 120, which can be used to position the hitch ball 121 at a suitable height for engaging a trailer when a hitch receiver on the tow vehicle would otherwise be too high or too low. The height of the ball portion 120 can be adjustable with respect to the hitch portion 110 utilizing a height adjustment mechanism 170. For example, the height adjustment mechanism 170 can include a vertical member 171, coupled between the hitch portion 110 and the ball portion 120, configured to allow adjustment of a height of the ball portion 120 with respect to the hitch portion 110 in direction 172. The weight distributing trailer hitch 100 can therefore include multiple separable components in a height-adjustable device. The height adjustment mechanism 170 can include height adjustment openings 173 in the vertical member 171. The height adjustment mechanism 170 can also include two or more height adjustment pin openings 174a, 174b in the ball portion 120 (e.g., in the ball support structure 122). In addition, the height adjustment mechanism 170 can include two or more height adjustment pins 175a, 175b (e.g., fasteners) removably extendable at least partially through the height adjustment pin openings 174a, 174b in the ball portion 120 and the height adjustment openings 173 in the vertical member 171. In one aspect, the ball support structure 122 can be configured to interface with the vertical member 171. For example, the vertical member 171 and the ball support structure 122 can be configured with complementary geometries to facilitate a stable engagement of the vertical member 171 and the ball support structure 122 when coupled to one another via the height adjustment pins 175a, 175b, as discussed above. As discussed above, the spring bars 130a, 130b can be coupled to the ball support structure 122 of the ball portion 120. The spring bars 130a, 130b can therefore move with the ball portion 120 when the height of the hitch ball 121 is adjusted. It should be recognized that the ball portion 120 need not be height adjustable and may be permanently fixed relative to the hitch portion 110 (e.g., optionally vertically offset by the vertical member 171).

In some embodiments, the weight distributing trailer hitch 100 can be configured to adjustably distribute weight of the trailer relative to the vehicle. For example, the spring bars can be vertically pivotal relative to the hitch portion, such as by being pivotally coupled to the hitch portion 110 or the ball portion 120. In the illustrated embodiment, the spring bars 130a, 130b are pivotally coupled to the ball support structure 122 of the ball portion 120. In this case, the weight distributing trailer hitch 100 includes a spring bar base 131 supporting the spring bars 130a, 130b. The spring bars 130a, 130b are rotatably coupled to the spring bar base 131 in a manner that constrains the spring bars 130a, 130b to horizontal or lateral movement relative to one another and to the hitch and ball portions 110, 120 to enable adjustment of the spring bars 130a, 130b for coupling with the "A" frame of the tongue of a trailer. The spring bar base 131 is rotatable relative to the hitch portion 110 to facilitate vertical rotational movement or pivoting of the spring bars 130a, 130b relative to the hitch portion 110 about an axis 113. This enables adjustment of a tilt angle 132 (FIG. 2) of the spring bars 130a, 130b relative to the hitch portion 110. When the spring bars 130a, 130b are coupled to a trailer in the typical manner, increasing the tilt angle 132 can increase preload in the spring bars 130a, 130b, which can cause reverse torque on the hitch that shifts weight from the rear wheels of a tow vehicle to the front wheels of the tow vehicle to distribute the weight equally. On the other hand, decreasing the tilt angle 132 can decrease preload in the spring bars 130a, 130b, which can shift weight from the front wheels of the tow vehicle to the rear wheels of the tow vehicle. Thus, adjustment of the tilt angle can adjustably distribute weight of the trailer relative to the tow vehicle.

In one aspect, the spring bar base 131 can be rotatably coupled to the ball portion 120, such as to the ball support structure 122 at a pivot joint 114. Thus, the tilt angle 132 of the spring bars 130*a*, 130*b* relative to the hitch portion 110 is varied or adjusted by rotating or pivoting the spring bar base 131 and the spring bars 130*a*, 130*b* relative to the ball portion 120. In other words, in some embodiments, the ball portion is not rotated during tilt angle adjustment of the spring bars relative to the hitch portion (i.e., the ball portion remains rotationally fixed relative to the hitch portion) and therefore the spring bars can rotate vertically relative to the ball and hitch portions. It should be recognized that the pivot joint 114 can be located in any suitable position, such as relative to the hitch ball (e.g., forward, rearward, beneath or under the hitch ball 121), relative to the vertical member 171 (e.g., forward or rearward of the vertical member 171), etc. In the illustrated embodiment, the pivot joint 114 is located forward of the hitch ball 121 and the vertical member 171. A weight distributing trailer hitch 200 and a weight distributing trailer hitch 300 shown in FIGS. 5A and 5B are similarly configured in this regard, where each has a pivot joint 214, 314 located forward of a hitch ball 221, 321 and a vertical member 271, 371.

In one aspect, shown in FIG. 4, the weight distributing trailer hitch 100 can include a tilt adjustment mechanism 150 to selectively adjust the tilt angle 132 of the spring bars 130*a*, 130*b* relative to the hitch portion 110 to vary preload on the spring bars 130*a*, 130*b* and adjustably distribute weight of the trailer relative to the vehicle. The tilt adjustment mechanism 150 can be associated with any suitable component (e.g., associated with the ball portion 120 and/or the spring bar base 131) and located in any suitable position, such as relative to the hitch ball (e.g., forward, rearward, beneath or under the hitch ball 121), relative to the vertical member 171 (e.g., forward or rearward of the vertical member 171), relative to the pivot joint 114 (e.g., forward or rearward of the pivot joint 114). In the illustrated embodiment, the tilt adjustment mechanism 150 is associated with and supported by the spring bar base 131 and acts against the ball support structure 122. On the other hand, the hitches 200, 300 shown in FIGS. 5A and 5B, respectively, each have a tilt adjustment mechanism 250, 350 that is associated with and supported by a ball portion 220, 320 (e.g., a ball support structure 222, 322) and acts against a spring bar base 231, 331. In addition, the tilt adjustment mechanism 150 in the embodiment illustrated FIGS. 1-4 is located below and rearward of the hitch ball 121, as well as rearward of the vertical member 171. The tilt adjustment mechanism 150 is also shown (FIG. 2) as rearward of the pivot joint 114 in that the tilt adjustment mechanism 150 is located between the pivot joint 114 and distal ends 133*a*, 133*b* of the respective spring bars 130*a*, 130*b*. The hitches 200, 300 shown in FIGS. 5A and 5B are similarly configured in this regard.

The tilt adjustment mechanism 150 can include any suitable device or mechanism that can adjust the tilt angle 132, such as a gear mechanism (e.g., a worm gear, miter gear, etc.), a screw mechanism, a cam mechanism, a hydraulic cylinder, a pneumatic cylinder, an electric motor, etc., alone or in any combination and can be powered (e.g., by a motor) and/or hand-actuated. In the illustrated embodiment, the tilt adjustment mechanism 150 includes a gear mechanism that comprises a worm drive. In this case, a shaft 151 is coupled to a worm 152, which engages a gear 153. The gear 153 is coupled to a screw 154 that drives a traveling nut 155, which is prevented from rotating by an engagement with the spring bar base 131. The traveling nut is configured to interface with, and bear against, the ball portion 120. The shaft 151 can have a drive interface 156 (FIG. 1) to facilitate rotation of the worm 152 by a user, such as by using a wrench.

In some embodiments, the weight distributing trailer hitch 100 can also include a weight distribution indicator 160 to indicate when the weight of the trailer is evenly distributed to front and rear wheels of the vehicle. The weight distribution indicator 160 can include any suitable device or mechanism that can indicate the weight distribution of the trailer weight on the vehicle, such as (e.g., a load sensor, a load cell, a pressure sensor, a level, an inclinometer, a tilt sensor, etc.). In some embodiments, the weight distribution indicator can include a piston, a hydraulic medium (e.g., a fluid), and a pressure sensor or a load gauge.

In the illustrated embodiment, the weight distribution indicator 160 includes a reservoir 162 having a fluid 163 and a piston 164 disposed therein. The traveling nut 155 can interface with, and bear against, the piston 164, which can affect a pressure of the fluid 163 as a result of the force from the spring bars 130*a*, 130*b*. The weight distribution indicator 160 can also include a pressure sensor 166, or gauge, in fluid communication with the reservoir 162, such as via a conduit 167, to indicate a magnitude of the force based on the pressure of the fluid. The pressure sensor 166 can be calibrated to indicate when the weight of the trailer has been evenly distributed among the front and rear wheels of the tow vehicle. In some embodiments, the weight distribution indicator 160 can be associated with the ball portion 120. The weight distribution indicator 160 can also include a display 161 as described herein configured to indicate the weight distribution of the trailer on the tow vehicle. In some embodiments, a display can be operably coupled to a load gauge or pressure sensor that both measures a load and displays information regarding how the trailer weight is distributed between the front and rear of the vehicle. In one aspect, the display 161 and/or a diameter of the piston 164 can be calibrated to provide an indication that the weight of the trailer is evenly distributed among the front and rear wheels of the tow vehicle. The weight distribution indicator 160 can also include a transmitter 165 as described herein configured to communicate with the display 161.

In use, the trailer can be leveled, the ball height of the hitch 100 can be properly set, and the tongue of the trailer can be coupled to the ball 121 such that the tow vehicle is subjected to the full tongue weight of the trailer. This will load the rear wheels of the tow vehicle and remove weight from the front wheels of the tow vehicle. The spring bars 130*a*, 130*b* of the hitch 100 can then be coupled to the trailer in the usual manner, such as securing free ends of the spring bars below an "A" frame tongue of the trailer with cables, chains, brackets, etc. The tilt angle 132 of the spring bars 130*a*, 130*b* relative to the hitch and ball portions 110, 120 can then be increased, as described above, to redistribute some of the weight of the trailer from the rear wheels of the tow vehicle to the front wheels of the tow vehicle. The tilt angle 132 can be adjusted until the trailer weight is evenly distributed on the front and rear of the tow vehicle. One advantage of the present technology is that the weight distribution of the trailer can be adjusted at the hitch 100 without disassembly of the hitch 100 or of the couplings of the hitch 100 to the trailer. This is more convenient and less time-consuming than with typical weight distribution hitches, which require a user to iteratively perform adjustments to the spring bar couplings to the trailer in order to achieve proper weight distribution. The weight distributing hitch technology disclosed herein can therefore enable quicker and easier set-up on different tow vehicle/trailer combinations than is possible with other weight distributing hitches.

In one aspect, the weight distribution indicator 160 can indicate when the trailer weight has been evenly distributed on the tow vehicle. For example, the weight distribution indicator 160 can be configured to display a quantity that has been calibrated to be proportional to the tongue weight displayed by the load measurement device 140. Thus, in some embodiments, the tilt angle 132 can be adjusted until the quantity displayed by the weight distribution indicator 160 equals the tongue weight measured by the load measurement device 140 prior to connection of the spring bars 130*a*, 130*b* to the trailer, at which point the trailer weight has been evenly distributed across the front and rear of the tow vehicle.

FIGS. 6-9 illustrate is a weight distributing trailer hitch 400 in accordance with another example of the present disclosure. The hitch 400 is similar in many respects to the hitches 100, 200, 300 shown in FIGS. 1-5B. In particular, the hitch 400 includes a hitch portion 410 for interfacing with a hitch receiver associated with a tow vehicle, a ball portion 420 to facilitate coupling with a tongue 415 of a trailer (e.g., with a hitch ball 421), one or more spring bars 430*a*, 430*b* for distributing weight of the trailer relative to the tow vehicle, and a load measurement device 440 to determine a magnitude of a downward force 412 on the hitch ball 421 and, therefore, the tongue weight of the trailer. The spring bars 430*a*, 430*b* can be configured to couple to respective arms 416*a*, 416*b* of an "A" frame portion of the tongue 415 of the trailer.

The hitch portion 410 and the ball portion 420 can include any suitable feature and can have any suitable structure in accordance with the present disclosure. Similarly, the load measurement device 440 can be of any suitable type and can include any suitable feature, such as those disclosed herein. For example, the load measurement device 440 can be coupled to a display, and structures can be included to provide wired and/or wireless connectivity to a display and/or a remote device (e.g., a mobile device), as described herein.

As with the hitches 100, 200, 300 shown in FIGS. 1-5B, the hitch 400 can be configured to adjustably distribute weight of the trailer relative to the vehicle by vertically pivoting the spring bars 430*a*, 430*b* relative to the hitch portion 410. The spring bars 430*a*, 430*b* are coupled to a spring bar base 431, which is rotatably coupled to the ball portion 420 (e.g., to a ball support structure 422) at a pivot joint 414 to facilitate vertical rotational movement or pivoting of the spring bars 430*a*, 430*b* relative to the hitch portion 410 about an axis 413. This enables adjustment of a tilt angle 432 (FIGS. 7A and 7B) of the spring bars 430*a*, 430*b* relative to the hitch portion 410. When the spring bars 430*a*, 430*b* are coupled to a trailer in the typical manner, increasing or adjusting the tilt angle 432 (i.e., rotating the spring bars 430*a*, 430*b* downward from the angle 432 shown in FIG. 7A to the angle 432 shown in FIG. 7B) can increase preload in the spring bars 430*a*, 130*b*, which can cause reverse torque on the hitch that shifts weight from the rear wheels of a tow vehicle to the front wheels of the tow vehicle to distribute the weight equally. On the other hand, decreasing or adjusting the tilt angle 432 (i.e., rotating the spring bars 430*a*, 430*b* upward from the angle 432 shown in FIG. 7B to the angle 432 shown in FIG. 7A) can decrease preload in the spring bars 130*a*, 130*b*, which can shift weight from the front wheels of the tow vehicle to the rear wheels of the tow vehicle. Thus, adjustment of the tilt angle 432 can adjustably distribute weight of the trailer relative to the tow vehicle.

The hitch 400 can include a tilt adjustment mechanism 450 to selectively adjust the tilt angle 432 of the spring bars 430*a*, 430*b* relative to the hitch portion 410 to vary preload on the spring bars 430*a*, 430*b* and adjustably distribute weight of the trailer relative to the vehicle. The tilt adjustment mechanism 450 can include any suitable feature and can have any suitable structure in accordance with the present disclosure. In the illustrated embodiment, the tilt adjustment mechanism 450 is located forward of the hitch ball 421, but rearward of or behind a vertical member 471 that may be used to facilitate adjustment of a height of the hitch ball 421 as disclosed herein. The tilt adjustment mechanism 450 is also shown as forward or in front of the pivot joint 414 in that the pivot joint 414 is located between the adjustment mechanism 450 and distal ends 433*a*, 433*b* of the respective spring bars 430*a*, 430*b* (FIGS. 7A and 7B).

Although any suitable type of tilt adjustment mechanism may be utilized, in the illustrated embodiment, the tilt adjustment mechanism 450 includes a screw mechanism (see cross-sectional view in FIG. 9) that comprises a threaded rod 457 (e.g., a bolt or a screw) with a head 458 supported by the ball portion 420 and a nut 459 supported by the spring bar base 431. In this case, the head 458 is configured to interface with, and bear against, the ball support structure 422 (e.g., via a washer or other interface structure). The head 458 prevents downward movement of the threaded rod 457 relative to the ball support structure 422. The head 458 can be at least partially disposed within a recess or cavity of the ball support structure 422 and can be captured and maintained within the cavity by a pin 423 (FIG. 6) that extends into a side recess of the head 458. The head 458 can have a spherical interface with the ball support structure 422 to facilitate pivoting of the threaded rod 457 relative to the ball support structure 422 as the spring bar base 431 rotates throughout its range of motion to tilt the spring bars 430*a*, 430*b*. The nut 459 can have a cylindrical configuration and is adapted to interface with and bear against the spring bar base 431. The interface of the nut 459 and the spring bar base 431 is configured to prevent rotation of the nut 459 about a longitudinal rotational axis of the threaded rod 457 (e.g., a vertical axis) while allowing rotation of the nut 459 about an axis parallel to the axis 413 (e.g., a horizontal axis), which enables the nut 459 to maintain proper alignment with the threaded rod 457 throughout relative rotation of the spring bar base 431 and the ball portion 420. Thus, rotation of the threaded rod 457 in one direction causes the threaded rod 457 to thread through the nut 459, which causes rotation the spring bar base 431 relative to the ball portion 420 to increase preload on the spring bars 430*a*, 430*b*. Rotation of the threaded rod 457 in the opposite direction facilitates a decrease in preload on the spring bars 430*a*, 430*b*. The head 458 can have a drive interface 456 (FIG. 9) to facilitate rotation of the threaded rod 457 by a user, such as by using a wrench. Although the head 458 is shown associated with the ball support structure 422 and the nut 459 is shown associated with the spring bar base 431, it should be recognized that the nut 459 can be associated with the ball support structure 422 and the head 458 can be associated with the spring bar base 431.

Figure 10:
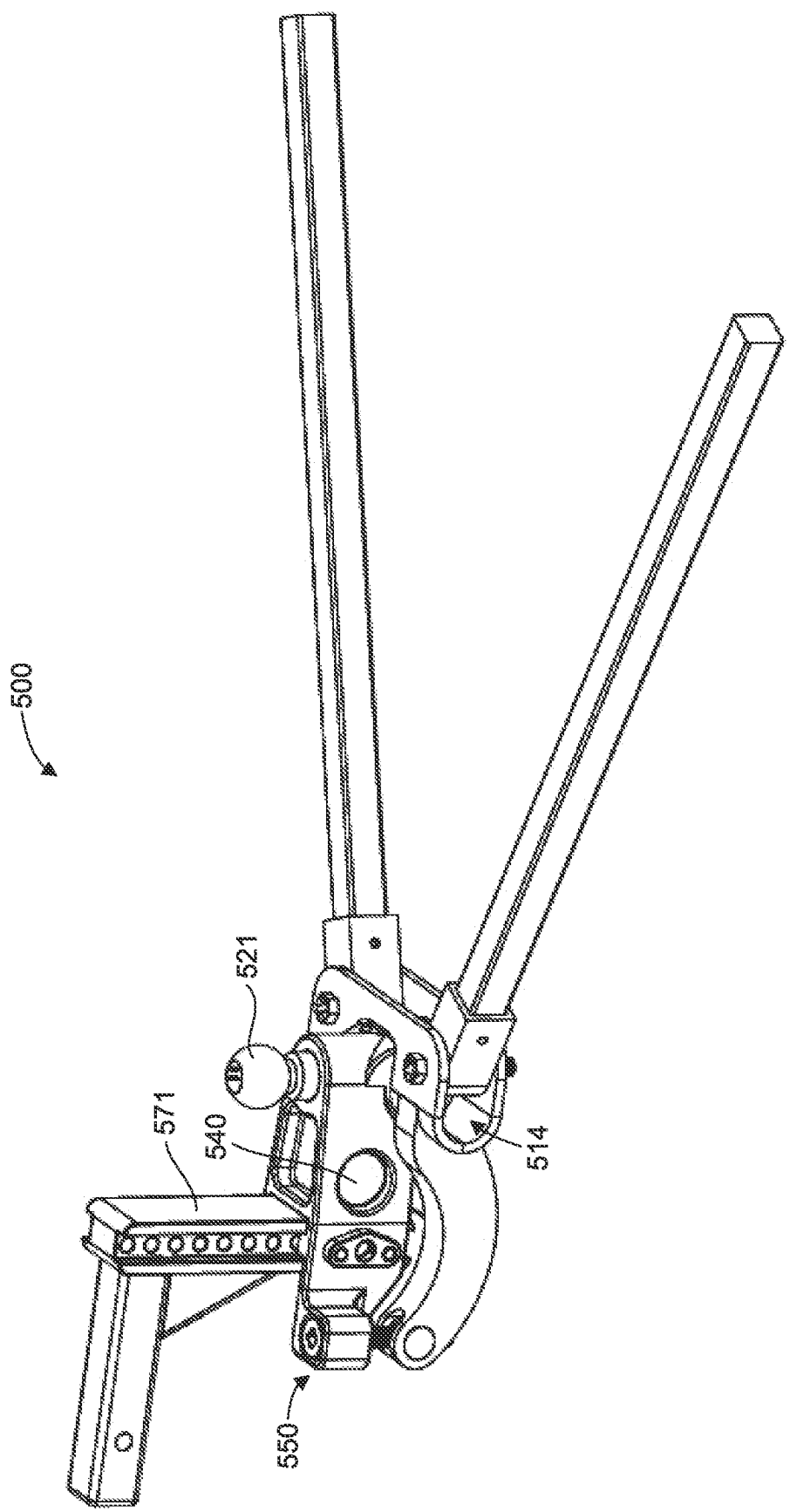
FIG. 10 illustrates a perspective view of a weight distributing trailer hitch, in accordance with another example of the present disclosure.

Although the pivot joint 414 can be located in any suitable position, in the illustrated embodiment, the pivot joint 414 is located rearward of or behind the vertical member 471 and, more particularly, under or beneath the hitch ball 421. This pivot joint configuration is also shown in the weight distributing trailer hitch 500 of FIG. 10, where a pivot joint 514 is located rearward of or behind a vertical member 571, as well as under or beneath a hitch ball 521. Unlike the hitch 400 shown in FIGS. 6-9, however, the hitch 500 of FIG. 10 includes [an] a tilt adjustment mechanism 550 that is located forward or in front of the vertical member 571.

The pivot joint 414 can be of any suitable configuration to facilitate relative rotation between the spring bars 430a, 430b and the hitch portion 410. In the illustrated embodiment (see FIG. 9), the ball portion 420 includes trunnions 426 that laterally extend from the ball support structure 422. The spring bar base 431 can include a pivot body 434 that is configured to interface with the trunnions 426 to form the pivot joint 414. The pivot body 434 can also be configured to interface and rotatably couple with the spring bars 430a, 430b (e.g., for lateral pivoting of the spring bars 430a, 430b for coupling with the trailer frame arms 416a, 416b). The spring bar base 431 can also include a lever arm 435 coupled to the pivot body 434 that extends forward to interface with the tilt adjustment mechanism 450 (e.g., the nut 459) to facilitate adjusting the tilt angle 432 of the spring bars 430a, 430b.

In one aspect exemplified by the hitches 100, 200 shown in FIGS. 1-5A, these hitches 100, 200 include respective load measurement devices 140, 240 and weight distribution indicators 160, 260. In another aspect, however exemplified by the hitches 300, 400, 500 of FIGS. 5B-10, these hitches include respective load measurement devices 340, 440, 540 and no weight distribution indicators. Thus, in this case, the only load instrumentation used to assist in distributing trailer load on the front and rear axles of a tow vehicle is a load measurement device for measuring downward force on the hitch ball. This is discussed in more detail below with respect to FIG. 14.

With further reference to the hitch 400 of FIGS. 6-9, the spring bars 430a, 430b can be coupled to the trailer (e.g., the arms 416a, 416b of the trailer frame) in any suitable manner known in the art, such as utilizing a chain, a cable, a bracket, etc. As shown in the illustrated embodiment, the spring bars 430a, 430b are coupled to the arms 416a, 416b of the trailer frame with spring bar trailer attachment brackets 480a, 480b, respectively.

Figure 11A:
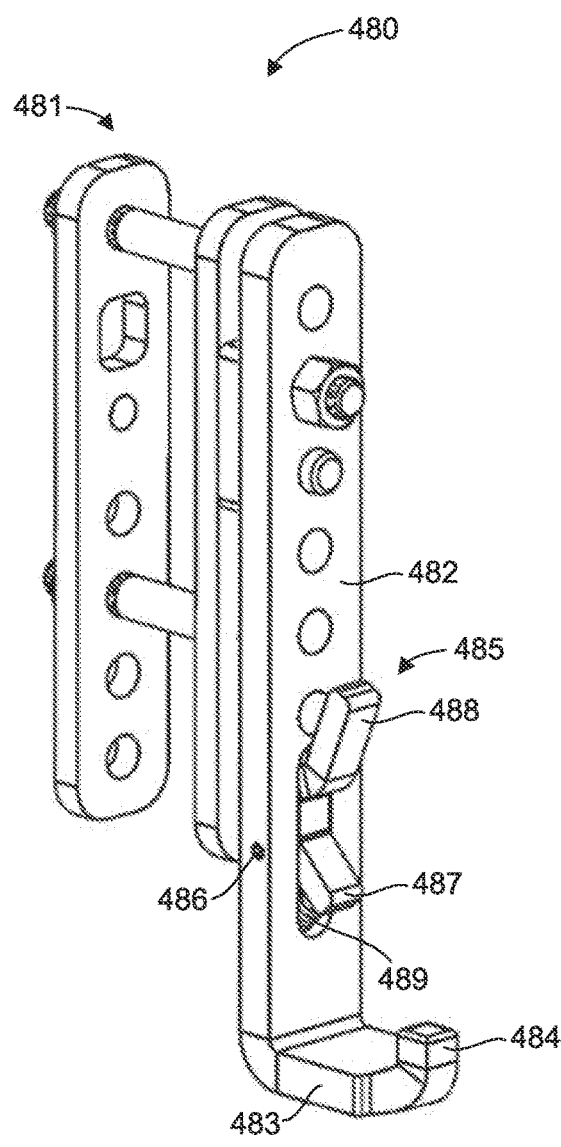
FIG. 11A illustrates a perspective view of a spring bar trailer attachment bracket, in accordance with an example of the present disclosure.
Figure 11B:
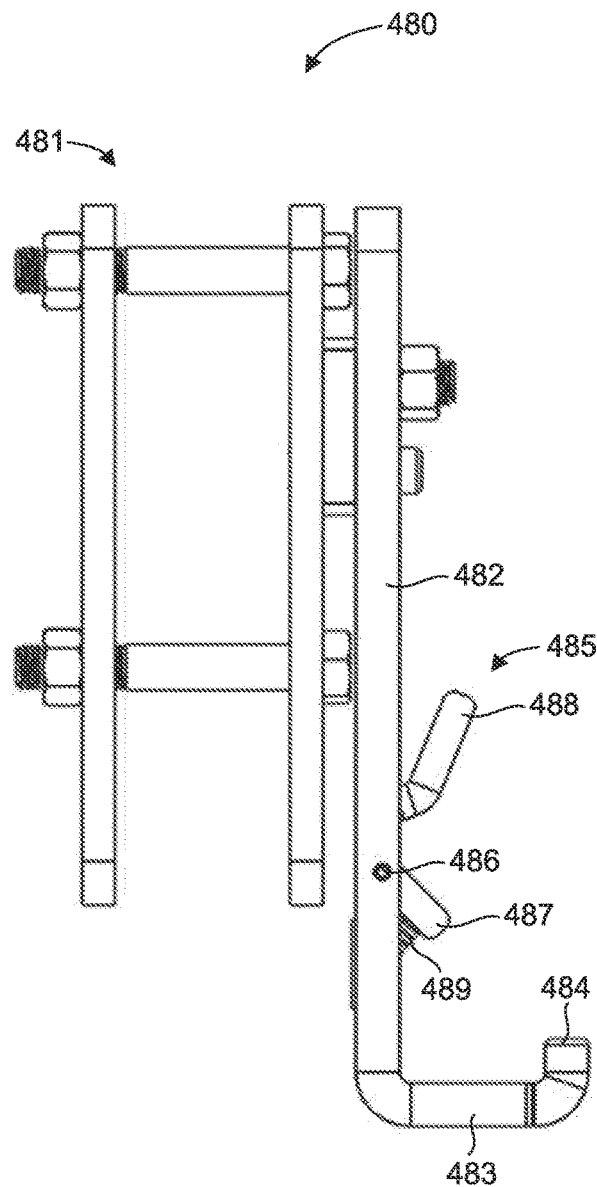
FIG. 11B illustrates an end view of the spring bar trailer attachment bracket of FIG. 11A.
Figure 12A:
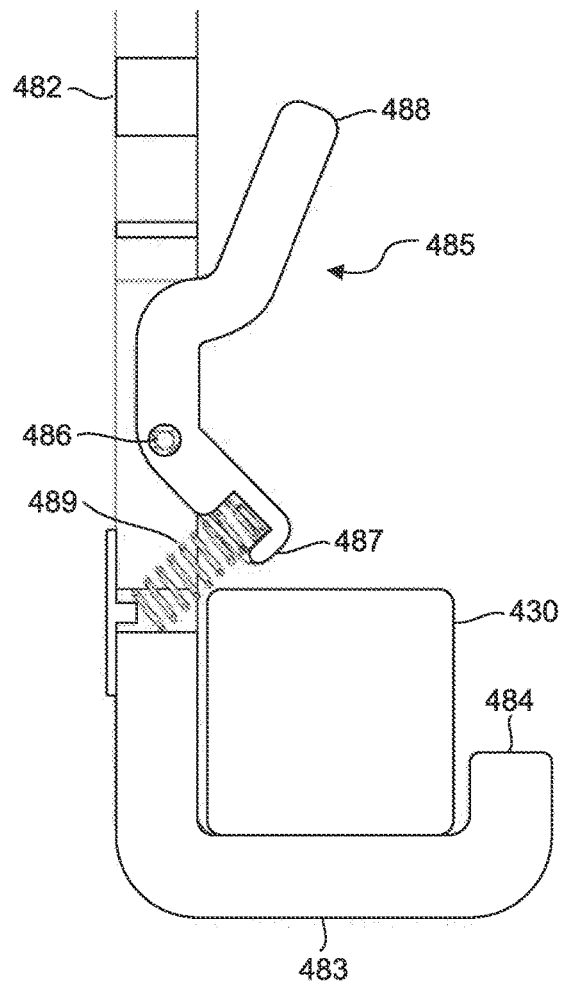
FIG. 12A illustrates a cross-sectional end view of the spring bar trailer attachment bracket of FIG. 11A and a spring bar in a capture configuration.
Figure 12B:
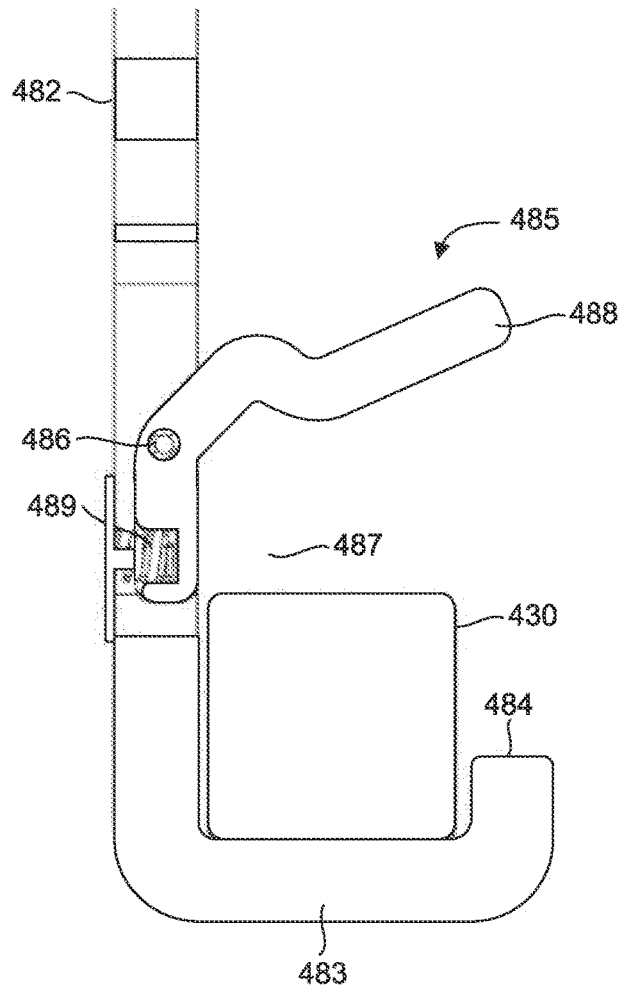
FIG. 12B illustrates a cross-sectional end view of the spring bar trailer attachment bracket of FIG. 11A and a spring bar in a release configuration.

Perspective and end views of a representative spring bar trailer attachment bracket 480 isolated from other components is shown in FIGS. 11A and 111B. FIGS. 12A and 12B show cross-sectional views of the bracket 480 with a representative spring bar 430 in a capture configuration (FIG. 12A) and a release configuration (FIG. 12B). The bracket 480 can include a frame attachment mechanism 481 operable to couple with a trailer frame. The frame attachment mechanism 481 can include any suitable feature or device known in the art for coupling a bracket to a support arm, such as a clamp, hook, clip, tab, pin, bolt, screw, etc. A vertical support arm 482 can be coupled to the frame attachment mechanism 481 and can extend downward to facilitate engagement with the spring bar 430. In one aspect, a vertical height of the vertical support arm 482 can be adjusted by varying an attachment location of the vertical support arm 482 on the frame attachment mechanism 481. A bottom end of the vertical support arm 482 can provide a lateral interface for the spring bar 430. A lower spring bar stop 483 can extend laterally outward from the bottom end of the vertical support arm 482 to provide a lower interface for the spring bar 430. A lateral side stop 484 can extend upward from an end of the lower spring bar stop 483 opposite the vertical support arm 482 to provide another lateral interface for the spring bar 430. The vertical support arm 482, the lower spring bar stop 483, and the lateral side stop 484 can therefore constrain the spring bar 430 in a downward direction and opposite lateral directions.

The bracket 480 can also include a pivotable capture arm 485 that can alternately constrain the spring bar 430 in a vertical direction when in a capture configuration (FIG. 12A) and facilitate assembly or removal of the spring bar 430 when in a release configuration (FIG. 12B). The capture arm 485 can be secured to the vertical support arm 482 by a pin 486, which can enable pivoting or rotation of the capture arm 485 relative to the vertical support arm 482. A lower end of the capture arm 485 is an upper spring bar stop 487 that can extend away from the vertical support arm 482 and over the spring bar 430 to provide an upper interface for the spring bar 430 when in the capture configuration. An upper end of the capture arm 485 can be configured as a user interface 488 to facilitate rotation of the capture arm 485 by a user such that the user interface 488 rotates downward and away from the vertical support arm 482. Such rotation of the capture arm 485 can cause rotation of the upper spring bar stop 487 toward the vertical support arm 482 sufficient to provide clearance for the spring bar 430 past the lateral side stop 484 for assembling or removing the spring bar 430. The vertical support arm 482 may be configured with an opening to receive at least a portion of the upper spring bar stop 487 to facilitate clearance for the spring bar 430. In one aspect, the capture arm 485 can be spring-loaded and biased (e.g., by a spring 489) to the capture position to prevent unwanted release of the spring bar 430. In some embodiments, the capture arm 485 can be maintained in the capture position by mechanical interference (e.g., provided by a removable pin, ring, and/or clip, etc.) with or without the use of a biasing spring.

Figure 13:
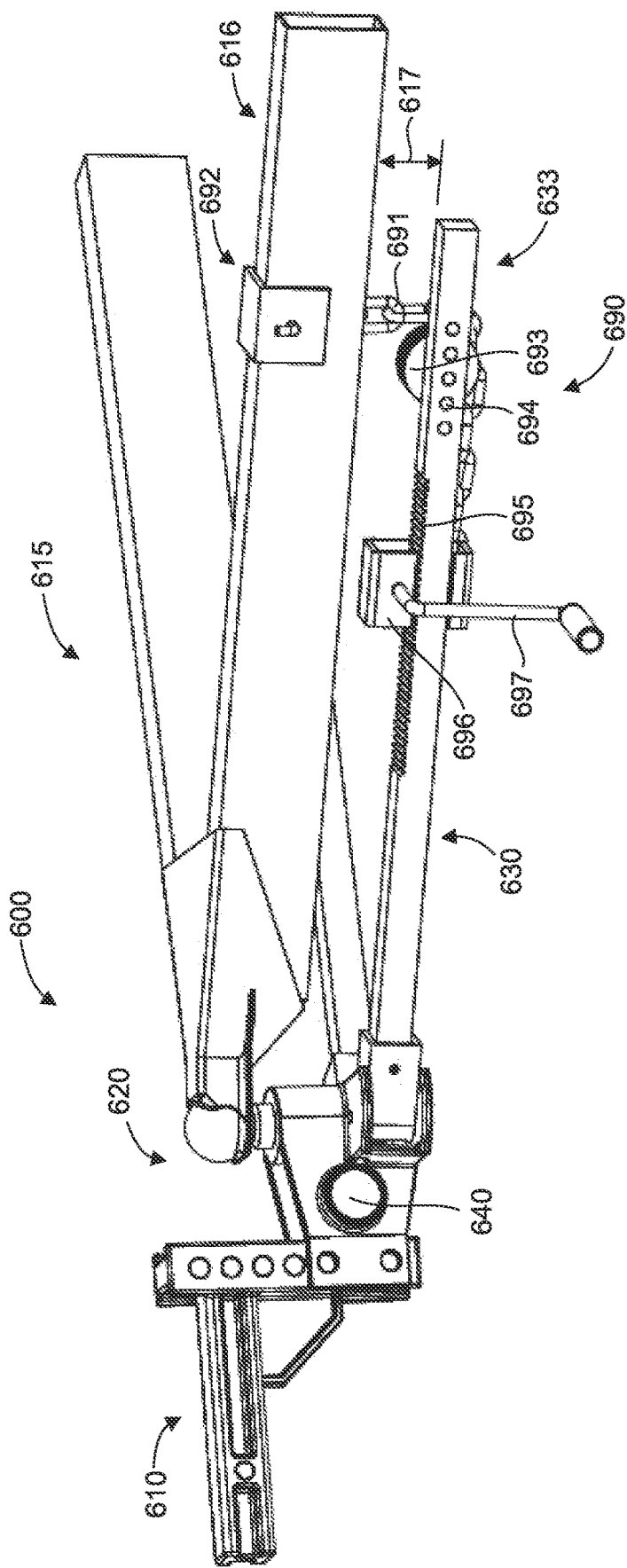
FIG. 13 illustrates a perspective view of a weight distributing trailer hitch, in accordance with an example of the present disclosure.

FIG. 13 illustrates a perspective view of a weight distributing trailer hitch 600, in accordance with an example of the present disclosure. The hitch 600 can include a hitch portion 610 for interfacing with a hitch receiver associated with a vehicle, a ball portion 620 to facilitate coupling with a tongue 615 of a trailer (e.g., with a hitch ball), one or more spring bars 630 for distributing weight of the trailer relative to the vehicle, and a load measurement device 640 to determine a magnitude of a downward force on the hitch ball and, therefore, the tongue weight of the trailer. The spring bars 630 can be configured to couple to arms 616 of an "A" frame portion of the tongue 615 of the trailer.

As with other hitches disclosed herein, the hitch 600 can be configured to adjustably distribute weight of the trailer relative to the tow vehicle. In this case, however, the spring bars 630 are not configured to vertically rotate relative to the hitch portion 610 to provide for tilt adjustment as a means to adjust preload on the spring bars 630. Instead, preload on the spring bars 630 can be adjusted by adjusting a vertical distance 617 between the spring bars 630 and the trailer frame at the attachment of the spring bars 630 to the frame (e.g., the arms 616). In particular, the hitch 600 can include a spring bar adjustment mechanism 690 configured to adjust the preload of the spring bar 630 by selectively adjusting the coupling length or vertical distance 617 between a distal end 633 of the spring bar 630 and the frame (e.g., the arms 616). The spring bar adjustment mechanism 690 can include a flexible tension member 691 (e.g., a chain or cable) coupled to the arm 616 via a bracket 692. The spring bar adjustment mechanism 690 can also include a pulley 693 or other suitable device for redirecting the flexible tension member 691 and facilitating movement of the flexible tension member 691 relative to the spring bar 630. The pulley 693 can be coupled to a side of the spring bar 630 and configured to direct the flexible tension member 691 vertically to the bracket 692 and horizontally along the spring bar 630. A position of the pulley 693 along the spring bar 630 can be adjustable by selecting one of several mounting holes 694 in the spring bar 630. The spring bar adjustment mechanism 690 can further include a rack 695 and pinion gear (hidden from view). The rack gear 695 can extend along the spring bar 630 (e.g., along a top of the spring bar 630) and, in some embodiments, may be incorporated into or integral with the spring bar 630. The pinion gear can be housed in a carriage 696 that is configured to maintain the pinion gear in engagement with the rack gear 695 and facilitate movement of the pinion gear along the rack gear 695. The pinion gear can be driven by a hand crank 697 or other suitable device, such as a motor (not shown). The flexible tension member 691 can also be coupled to the carriage 696. Thus, the end of the flexible tension member 691 coupled to the carriage 696 can be moved horizontally along a length of the spring bar 630 by actuation of the pinion gear (e.g., by the hand crank 697) to adjust the distance 617 between the end 633 of the spring bar 630 and the trailer frame 616 to achieve a suitable preload in the spring bar 630 for trailer load distribution on the tow vehicle. The horizontal position of the carriage 696 along the spring bar 630 can be maintained by a locking mechanism (not shown). In one embodiment, the pulley and rack and pinion gear mechanism can be substituted with a spool (not shown) for the flexible tension member 691 to wrap the around. The spool can be actuated (e.g., by a hand crank or motor) to wind/unwind the flexible tension member 691 to achieve a suitable preload in the spring bar 630 for trailer load distribution on the tow vehicle.

Figure 14:
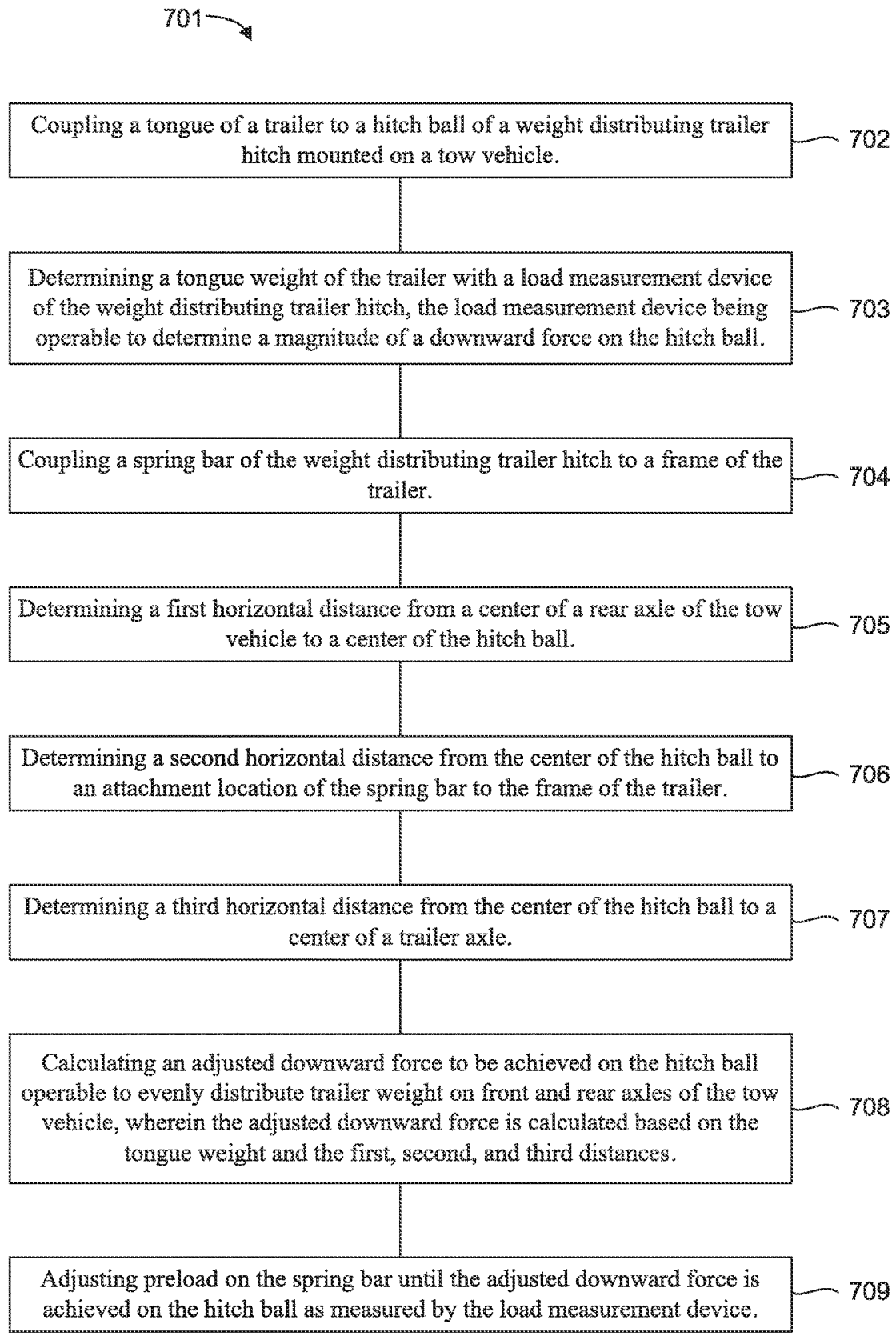
FIG. 14 illustrates a method for distributing trailer weight on a tow vehicle, in accordance with an example of the present disclosure.
Figure 15:
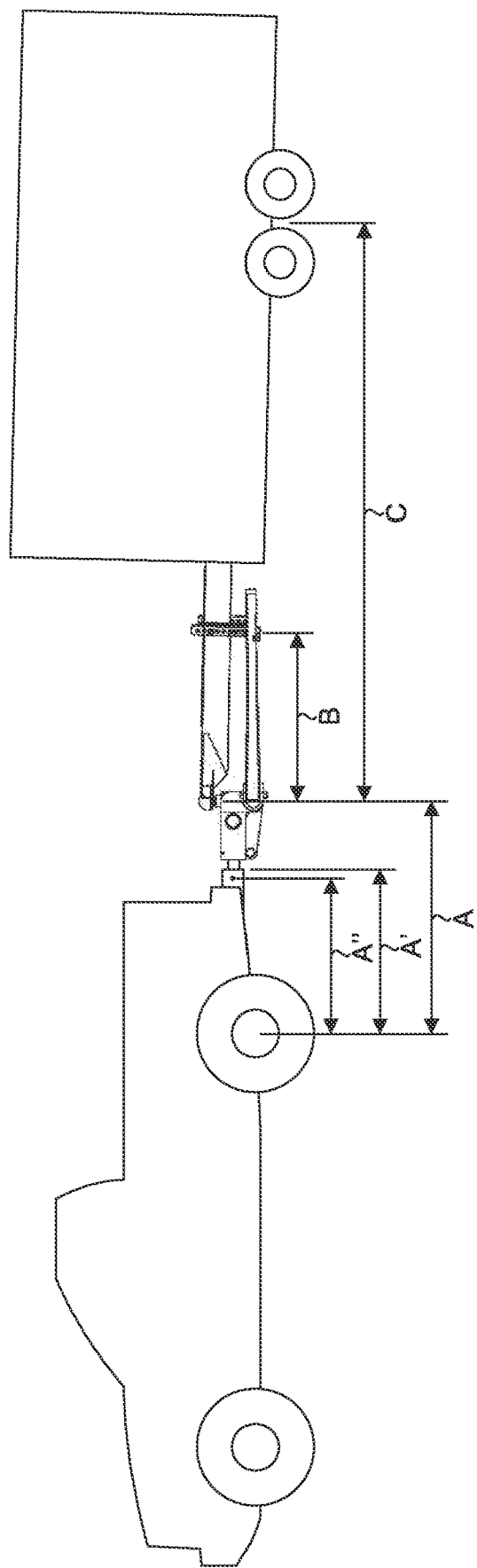
FIG. 15 illustrates dimensions of a tow vehicle and trailer used in calculations that facilitate even distribution of trailer load on front and rear axles of the tow vehicle, in accordance with an example of the present disclosure.

FIG. 14 illustrates aspects of a method 701 for preparing to tow a trailer with tow vehicle or, more specifically, a method for distributing trailer weight on a tow vehicle. Some aspects of the method can utilize certain dimensions of a tow vehicle and trailer that are illustrated in FIG. 15. These dimensions can be used to facilitate properly preloading the spring bars to achieve a balanced distribution of trailer weight onto the front and rear axles of the tow vehicle, as described in more detail below.

The method 701 can include coupling a tongue of a trailer to a hitch ball of a weight distributing trailer hitch mounted on a tow vehicle, as shown in block 702. The method can also include determining a tongue weight of the trailer with a load measurement device of the weight distributing trailer hitch, the load measurement device being operable to determine a magnitude of a downward force on the hitch ball, as shown in block 703. Tongue weight is typically measured prior to connecting spring bars to the trailer frame so that a true tongue weight of the trailer can be determined without any load distributing effects from the spring bars. The measured tongue weight can be recorded for later reference, as discussed below. The method can also include coupling a spring bar of the weight distributing trailer hitch to a frame of the trailer, as shown in block 704. The method can also include determining a first horizontal distance (A in FIG. 15) from a center of a rear axle of the tow vehicle to a center of the hitch ball, as shown in block 705. The method can also include determining a second horizontal distance (B in FIG. 15) from the center of the hitch ball to an attachment location of the spring bar to the frame of the trailer, as shown in block 706. Typically, the distance B will be from 28 to 32 inches to properly utilize the spring bars, although other distances or ranges are possible. The method can also include determining a third horizontal distance (C in FIG. 15) from the center of the hitch ball to a center of a trailer axle (or to a center of a group of axles as in FIG. 15 if the trailer has multiple axles), as shown in block 707. The user can measure the distances A, B, and C and record them for later use. For example, the tongue weight and the distances A, B, and C shown in FIG. 15 can be utilized by software (e.g., stored as variables in a formula) to assist a user in properly distributing trailer weight on the front and rear axles of a tow vehicle. In one embodiment, the user can measure the distance A' and/or A" in FIG. 15 for use by software as these distances may be easier for a user to measure. In this case, the software can include size geometry of the hitch to arrive at the distance A when A' and/or A" is provided by the user. In some embodiments, the software can be executed by a controller on an electronic device (e.g. either locally or remotely from the hitch), such as a mobile device (e.g., a smartphone, tablet, laptop, etc.). In this case, the measured tongue weight can be communicated (e.g., wired or wirelessly transmitted, such as via Bluetooth) to the device. In one aspect, data (e.g., dimensions A, B, and C) pertaining to different hitch, tow vehicle, and trailer combinations can be saved by the software in unique profiles to facilitate quick and easy load distribution setup when changing trailers, tow vehicles, etc.

With the measured data acquired, the method can further include calculating an adjusted downward force to be achieved on the hitch ball operable to evenly distribute trailer weight on front and rear axles of the tow vehicle, wherein the adjusted downward force is calculated based on the tongue weight and the first, second, and third distances, as shown in block 708. Although software may be utilized to perform calculations, it should be recognized that calculations may be performed by a user. In some embodiments, the adjusted downward force to be achieved on the hitch ball is equal to the tongue weight multiplied by $$\left(1 + \frac{1 - \frac{B}{C}}{\frac{B}{A} + \frac{B}{C}}\right),$$

where A is the first horizontal distance, B is the second horizontal distance, and C is the third horizontal distance illustrated in FIG. 15. The formula provided is specifically for the case of a load measurement device measuring downward force on the hitch ball as opposed to a case where both a load measurement device and a weight distribution indicator are utilized. It should be recognized that a force measurement can be taken by a different device in any suitable location for the purposes of achieving a balanced trailer load on the front and rear axles of the tow vehicle. For example, a force measurement can be performed by a weight distribution indicator as described herein, such as between the ball portion and the spring bar base (forward or rearward of the hitch ball), where the spring bars are attached the frame of the trailer, or between the hitch portion and the hitch receiver. Furthermore, load or force measurement may be determined using a controller device containing logic that determines.

Additionally, the method can also include adjusting preload on the spring bar until the adjusted downward force is achieved on the hitch ball as measured by the load measurement device, as shown in block 709. The adjusted downward force can be deemed achieved, and therefore the trailer load properly distributed on the tow vehicle front and rear axles, when the downward force measured by the load measurement device is within a suitable range (e.g., at or within about 10%) of a value of the calculated adjusted downward force. Preload on the spring bar can be adjusted in any suitable manner (e.g., suitable for any hitch embodiment disclosed herein). For example, in some embodiments, preload on the spring bar can be adjusted by adjusting a vertical tilt angle of the spring bar. In some embodiments, preload on the spring bar can be adjusted by adjusting a coupling length between a distal end of the spring bar and a frame of the trailer. In one aspect, a remote device executing the software can be in communication with the load measurement device and can alert the user (e.g., via audio, visual, haptic, etc.) when the target value of the adjusted downward force on the hitch ball has been reached. Thus, a user can make adjustments to the spring bar preload without needing to monitor the displayed load on the hitch ball but can instead rely on an alert that indicates a suitable preload on the spring bars has been achieved that properly distributes trailer load on the tow vehicle. All or some of the foregoing methods can be performed using a controller having sufficient logic to perform any needed calculations based on the inputs received and output a result to a user. Such a controller with such logic can be part of a remote electronic device, (e.g. smartphone, tablet, etc.) or can be located at the trailer hitch. In addition, such a controller can be a component in a machine connected to cloud storage medium or located elsewhere as desired by a user.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A weight distributing trailer hitch, comprising:
   a hitch portion operable to interface with a hitch receiver coupled to a vehicle;
   a ball portion comprising a ball support structure coupling the ball portion to the hitch portion and having a hitch ball operable to couple with a tongue of a trailer;
   a spring bar for distributing weight of the trailer relative to the vehicle;
   a spring bar base supporting the spring bar, wherein the spring bar base is rotatably coupled to the ball support structure at a pivot joint to facilitate vertically pivoting the spring bar relative to the hitch portion;
   a reservoir having a fluid and a piston disposed therein; and
   a pressure sensor in fluid communication with the reservoir, wherein the hitch ball is configured to exert a force on the piston, thereby affecting a pressure of the fluid in response to the downward force on the hitch ball.

2. The weight distributing trailer hitch of claim 1, further comprising a display operably coupled to the pressure sensor to indicate the magnitude of the downward force.

3. The weight distributing trailer hitch of claim 1, further comprising:
   a tilt adjustment mechanism configured to adjust the preload of the spring bar by selectively adjusting a tilt angle of the spring bar base about the pivot joint relative to the hitch portion.

4. The weight distributing trailer hitch of claim 3, wherein the tilt adjustment mechanism comprises a threaded rod, a gear mechanism, or a combination thereof.

5. The weight distributing trailer hitch of claim 3, wherein the tilt adjustment mechanism is associated with the spring bar base and acts against the ball support structure.

6. The weight distributing trailer hitch of claim 3, wherein the tilt adjustment mechanism is associated with the ball support structure and acts against the spring bar base.

7. The weight distributing trailer hitch of claim 3, wherein the tilt adjustment mechanism is located between the pivot joint and a distal end of the spring bar.

8. The weight distributing trailer hitch of claim 3, wherein the pivot joint is located between the tilt adjustment mechanism and a distal end of the spring bar.

9. The weight distributing trailer hitch of claim 3, wherein the pivot joint is located vertically below the hitch ball.

10. The weight distributing trailer hitch of claim 1, further comprising:
    a spring bar adjustment mechanism configured to adjust the preload of the spring bar by selectively adjusting a coupling length between a distal end of the spring bar and the frame of the trailer.

11. The weight distributing trailer hitch of claim 1, wherein a vertical height of the ball portion is adjustable.

12. The weight distributing trailer hitch of claim 1, further comprising a weight distribution indicator to indicate when the weight of the trailer is evenly distributed to front and rear wheels of the vehicle.

13. The weight distributing trailer hitch of claim 1, wherein the pressure sensor comprises a load cell.

14. The weight distributing trailer hitch of claim 1, wherein the pressure sensor comprises one or more of a processor, a memory, and a transmitter.

15. The weight distributing trailer hitch of claim 2, wherein the display comprises one or more of a processor, a memory, and a transmitter.

16. The weight distributing trailer hitch of claim 2, wherein the display is located adjacent the pressure sensor.

17. The weight distributing trailer hitch of claim 2, wherein the display is located remote from the pressure sensor.

18. The weight distributing trailer hitch of claim 17, wherein the display is located on a mobile device.

19. The weight distributing trailer hitch of claim 17, wherein the display is located within the towing vehicle.

20. The weight distributing trailer hitch of claim 10, wherein the spring bar adjustment mechanism comprises a flexible tension member, a pulley, a rack gear, a pinion gear, or a combination thereof.

21. A method for distributing trailer weight on a tow vehicle, comprising:
    coupling a tongue of a trailer to a hitch ball of a weight distributing trailer hitch mounted on a tow vehicle, said weight distributing trailer hitch comprising:
    a hitch portion operable to interface with a hitch receiver coupled to a vehicle;
    a ball portion comprising a ball support structure coupling the ball portion to the hitch portion and having a hitch ball operable to couple with a tongue of a trailer;
    a spring bar for distributing weight of the trailer relative to the vehicle; and a spring bar base supporting the spring bar, wherein the spring bar base is rotatably coupled to the ball support structure at a pivot joint to facilitate vertically pivoting the spring bar relative to the hitch portion;

determining a tongue weight of the trailer;

coupling a spring bar of the weight distributing trailer hitch to a frame of the trailer;

determining a first horizontal distance from a center of a rear axle of the tow vehicle to a center of the hitch ball;

determining a second horizontal distance from the center of the hitch ball to an attachment location of the spring bar to the frame of the trailer;

determining a third horizontal distance from the center of the hitch ball to a center of a trailer axle;

calculating an adjusted downward force to be achieved on the hitch ball operable to evenly distribute trailer weight on front and rear axles of the tow vehicle, wherein the adjusted downward force is calculated based on the tongue weight and the first, second, and third distances; and adjusting preload on the spring bar until the adjusted downward force is achieved on the hitch ball by adjusting an angle of a spring bar relative to a hitch portion by pivoting the spring bar base about the pivot joint.

22. The method of claim 21, wherein the adjusted downward force is achieved when the downward force is within 10% of a value of the adjusted downward force.

23. The method of claim 21, wherein the adjusted downward force to be achieved on the hitch ball is equal to the tongue weight multiplied by $$\left(1 + \frac{1 - \frac{B}{C}}{\frac{B}{A} + \frac{B}{C}}\right),$$

wherein A is the first horizontal distance, B is the second horizontal distance, and C is the third horizontal distance.

24. The method of claim 21, wherein adjusting preload on the spring bar comprises adjusting a coupling length between a distal end of the spring bar and the frame of the trailer.

25. A weight distributing trailer hitch, comprising:
a hitch portion operable to interface with a hitch receiver coupled to a vehicle;
a ball portion comprising a ball support structure coupling the ball portion to the hitch portion and having a hitch ball operable to couple with a tongue of a trailer;
a spring bar for distributing weight of the trailer relative to the vehicle;
a spring bar base supporting the spring bar, wherein the spring bar base is rotatably coupled to the ball support structure at a pivot joint to facilitate vertically pivoting the spring bar relative to the hitch portion; and
a weight distribution indicator to indicate when the weight of the trailer is evenly distributed to front and rear wheels of the vehicle.

26. The weight distributing trailer hitch of claim 25, further comprising:

a reservoir having a fluid and a piston disposed therein; and a pressure sensor in fluid communication with the reservoir, wherein the hitch ball is configured to exert a force on the piston, thereby affecting a pressure of the fluid in response to the downward force on the hitch ball.

27. The weight distributing trailer hitch of claim 26, further comprising a display operably coupled to the pressure sensor to indicate the magnitude of the downward force.

28. The weight distributing trailer hitch of claim 25, further comprising:
a tilt adjustment mechanism configured to adjust the preload of the spring bar by selectively adjusting a tilt angle of the spring bar base about the pivot joint relative to the hitch portion.

29. The weight distributing trailer hitch of claim 25, further comprising:
a spring bar adjustment mechanism configured to adjust the preload of the spring bar by selectively adjusting a coupling length between a distal end of the spring bar and the frame of the trailer.

30. The weight distributing trailer hitch of claim 28, wherein the tilt adjustment mechanism comprises a threaded rod, a gear mechanism, or a combination thereof.

31. The weight distributing trailer hitch of claim 25, wherein a vertical height of the ball portion is adjustable.

32. The weight distributing trailer hitch of claim 28, wherein the tilt adjustment mechanism is associated with the spring bar base and acts against the ball support structure.

33. The weight distributing trailer hitch of claim 28, wherein the tilt adjustment mechanism is associated with the ball support structure and acts against the spring bar base.

34. The weight distributing trailer hitch of claim 28, wherein the tilt adjustment mechanism is located between the pivot joint and a distal end of the spring bar.

35. The weight distributing trailer hitch of claim 28, wherein the pivot joint is located between the tilt adjustment mechanism and a distal end of the spring bar.

36. The weight distributing trailer hitch of claim 25, wherein the pivot joint is located vertically below the hitch ball.

37. The weight distributing trailer hitch of claim 26, wherein the pressure sensor comprises a load cell.

38. The weight distributing trailer hitch of claim 26, wherein the pressure sensor comprises one or more of a processor, a memory, and a transmitter.

39. The weight distributing trailer hitch of claim 27, wherein the display comprises one or more of a processor, a memory, and a transmitter.

40. The weight distributing trailer hitch of claim 27, wherein the display is located adjacent the pressure sensor.

41. The weight distributing trailer hitch of claim 27, wherein the display is located remote from the pressure sensor.

42. The weight distributing trailer hitch of claim 41, wherein the display is located on a mobile device.

43. The weight distributing trailer hitch of claim 41, wherein the display is located within the towing vehicle.

44. The weight distributing trailer hitch of claim 29, wherein the spring bar adjustment mechanism comprises a flexible tension member, a pulley, a rack gear, a pinion gear, or a combination thereof.

* * * * *